US012669732B2

(12) United States Patent　　　(10) Patent No.:　US 12,669,732 B2
Morinaga et al.　　　　　　　　　(45) Date of Patent:　　Jun. 30, 2026

(54) LIQUID CRYSTAL DISPLAY DEVICE

(71) Applicant: Sharp Display Technology Corporation, Kameyama City (JP)

(72) Inventors: Junichi Morinaga, Kameyama City (JP); Masahiro Yoshida, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 156 days.

(21) Appl. No.: 18/630,963

(22) Filed: Apr. 9, 2024

(65) Prior Publication Data

US 2024/0411188 A1　　Dec. 12, 2024

(30) Foreign Application Priority Data

Jun. 12, 2023　　(JP) ................................. 2023-096632

(51) Int. Cl.
G02F 1/1362　　　　(2006.01)
(52) U.S. Cl.
CPC ............................... G02F 1/136286 (2013.01)
(58) Field of Classification Search
CPC ..................... G02F 1/136286; G02F 1/136213
See application file for complete search history.

(56) References Cited

U.S. PATENT DOCUMENTS

| | | | | |
|---|---|---|---|---|
| 2013/0300962 | A1* | 11/2013 | Kitani | ................. G09G 3/3648 |
| | | | | 349/37 |
| 2018/0261627 | A1 | 9/2018 | An | |
| 2019/0302559 | A1* | 10/2019 | Itoh | ....................... G02F 1/1368 |
| 2021/0142754 | A1* | 5/2021 | Hayashi | ............ G02F 1/136227 |

FOREIGN PATENT DOCUMENTS

JP　　　　2019-536093 A　　12/2019

* cited by examiner

*Primary Examiner* — Nathanael R Briggs
(74) *Attorney, Agent, or Firm* — ScienBiziP, P.C.

(57)　　　　　　ABSTRACT

A liquid crystal display device includes: a source driver; a plurality of source lead lines connecting a plurality of source bus lines at one end to the source driver; and a plurality of capacitance lines each disposed to intersect with the plurality of source bus lines, and connected to a common potential, wherein the plurality of source lead lines include at least one first source lead line and at least one second source lead line that is longer than the first source lead line, the first source lead line is connected to the a first source bus line, and the second source lead line is connected to a second source bus line, and an area in which the second source bus line and one of the plurality of capacitance lines overlap with each other is smaller than an area in which the first source bus line and one of the plurality of capacitance lines overlap with each other.

14 Claims, 24 Drawing Sheets

LIQUID CRYSTAL DISPLAY DEVICE

CROSS-REFERENCE TO RELATED APPLICATIONS

This application claims the benefit of priority to Japanese Patent Application Number 2023-096632 filed on Jun. 12, 2023. The entire contents of the above-identified application are hereby incorporated by reference.

BACKGROUND OF THE INVENTION

Field of the Invention

The present disclosure relates to a liquid crystal display device.

Description of the Related Art

A liquid crystal display device includes a plurality of gate bus lines and a plurality of source bus lines connected to pixels in a display region. Among these lines, the source bus lines are connected to source drivers, arranged around the display region, with source lead lines.

Because the plurality of source bus lines and terminals of the source drivers are arranged at different intervals, lengths of the source lead lines are different from one another. Accordingly, amounts of resistance and parasitic capacitance are also different, depending on the lengths. Hence, depending on positions of the source bus lines, a difference could be observed in distortion of data signals applied to the source bus lines, and the display quality might deteriorate. For example, even if an image signal is input so that the entire display region is displayed in uniform color, stripe-patterned brightness unevenness might appear.

In order to reduce such a problem, Japanese Unexamined Patent Application Publication (Translation of PCT Application) No. 2019-536093 discloses a common line disposed separately from a data line (a source bus line) to adjust parasitic capacitance.

SUMMARY

The present disclosure sets out to provide a liquid crystal display device capable of reducing influence of resistance and parasitic capacitance caused by a difference in lengths of source lead lines, and of displaying an image with higher display quality.

A liquid crystal display device according to an embodiment of the present disclosure includes: a substrate having a main surface including a display region and a non-display region positioned out of the display region; a plurality of gate bus lines positioned in the display region and extending in a first direction; a plurality of source bus lines positioned in the display region, extending in a direction intersecting with the plurality of gate bus lines, and including at least one first source bus line and at least one second source bus line; a plurality of pixels arranged two-dimensionally in the display region, and each surrounded with a pair of gate bus lines included in the plurality of gate bus lines and adjacent to each other and with a pair of source bus lines included in the plurality of source bus lines and adjacent to each other; at least one source driver disposed in the non-display region; a plurality of source lead lines connecting the plurality of source bus lines at one end to the source driver; and a plurality of capacitance lines positioned in the display region, each disposed to intersect with the at least one first source bus line and the at least one second source bus line, and connected to a common potential. Each of the capacitance lines has: a first portion extending in the first direction; and a plurality of second portions extending, in a direction in which the source bus lines extend, at intersections with the at least one first source bus line and the at least one second source bus line. The plurality of second portions overlap with the source bus lines. The plurality of source lead lines include: at least one first source lead line; and at least one second source lead line. The at least one first source lead line is connected to the at least one first source bus line, and the at least one second source lead line is connected to the at least one second source bus line. The at least one second source lead line is longer than the at least one first source lead line. An area in which the second source bus line and one of the plurality of capacitance lines overlap with each other is smaller than an area in which the first source bus line and one of the plurality of capacitance lines overlap with each other.

An embodiment of the present disclosure can provide a liquid crystal display device capable of reducing influence of resistance and parasitic capacitance caused by a difference in lengths of source lead lines, and of displaying an image with higher display quality.

DESCRIPTION OF EMBODIMENTS

Figure 1:
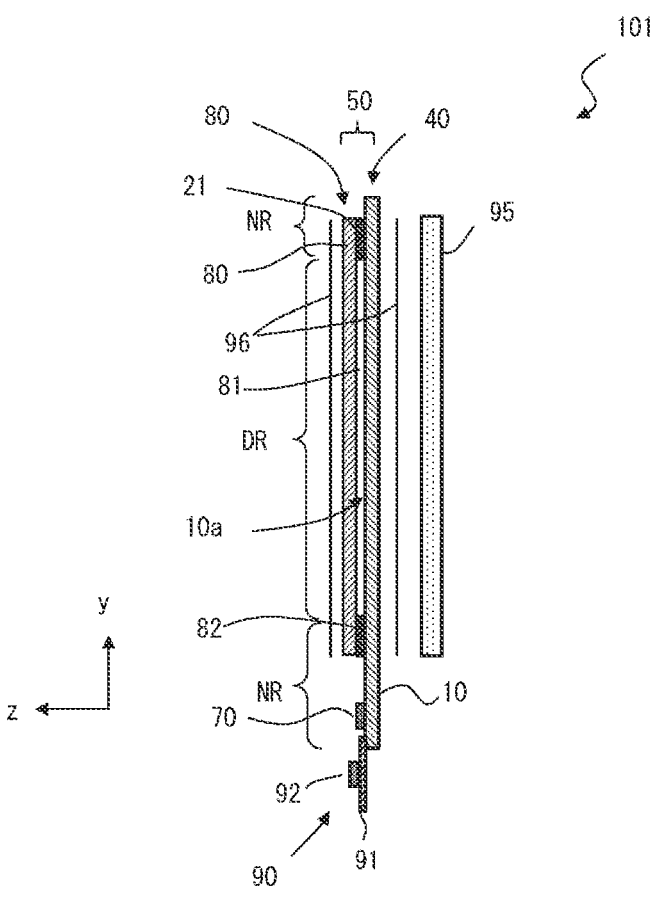
FIG. 1 is a schematic cross-sectional view of an exemplary configuration of a liquid crystal display device according to a first embodiment.

A liquid crystal display device disclosed in Japanese Unexamined Patent Application Publication No. 2019-536093 includes a common line including: a second sub-line extending in parallel with a gate bus line for each pixel unit; and a first sub-line extending in parallel with a source bus line and connecting the second sub-line for each pixel unit. The second sub-line overlaps with the source bus line with an insulating layer therebetween. An amount of parasitic capacitance can be adjusted with an area in which the second sub-line and the source bus line overlap with each other.

Japanese Unexamined Patent Application Publication No. 2019-536093 describes that stripe-patterned brightness unevenness is kept from appearing when parasitic capacitance of a source bus line connected to a source lead line having a large resistance value is made smaller than parasitic capacitance of a source bus line connected to a source lead line having a small resistance value.

However, the inventors of the disclosure have studied the liquid crystal display device of Japanese Unexamined Patent Application Publication No. 2019-536093, and found out a new problem of the structure caused by the facts that the common line is in a floating state and the first sub-line intersects with the gate bus line. Specifically, when a data signal to be applied to the source bus line and a scan signal to be applied to the gate bus line undergo variation, the variations can influence a potential of the pixel electrode through capacitance between the source bus line and the common line, capacitance between the gate bus line and the common line, and capacitance between the pixel electrode and the common line. In view of the above problem, the inventors of the disclosure have conceived a novel liquid crystal display device.

Embodiments of the present disclosure will be described below with reference to the drawings. The present disclosure shall not be limited to the embodiments below, and the designs presented in the embodiments can be appropriately modified within a scope of the configurations of the present disclosure. Moreover, identical reference signs are used to denote identical or substantially identical components among the drawings. Such components might not be repeatedly elaborated upon. Furthermore, the configurations described in the embodiments and in a modification thereof may be appropriately combined or modified unless otherwise departing from the scope of the present disclosure. For the sake of convenience, the drawings below are simplistically or schematically illustrated. In the drawings, some of the constituent members may be omitted. In addition, the dimensional ratios between the constituent members in the drawings are not necessarily the actual dimensional ratios.

First Embodiment

FIG. 1 is a schematic cross-sectional view of an exemplary configuration of a liquid crystal display device according to this embodiment. A liquid crystal display device 101 includes: a liquid crystal panel 50; and a control apparatus 90. Furthermore, the liquid crystal panel 50 includes: an active matrix substrate 40; a counter substrate 80; and a liquid crystal layer 81.

The active matrix substrate 40 includes a substrate 10 having a main surface 10*a*. The main surface 10*a* has: a display region DR; and a non-display region NR positioned around the display region DR to surround the display region DR. The display region DR is a region to contribute to displaying an image, and the non-display region is a region in which no image is displayed.

As will be described in detail below, the active matrix substrate 40 includes: a plurality of gate bus lines; a plurality of source bus lines; a capacitance line; and a plurality of pixel electrodes. Each of the pixel electrodes is connected through a pixel transistor to one of the plurality of gate bus lines and to one of the plurality of source bus lines.

The active matrix substrate 40 and the counter substrate 80 are bonded together with a predetermined clearance therebetween, using a seal 82 disposed to the non-display region NR. The liquid crystal layer 81 is provided between the active matrix substrate 40 and the counter substrate 80, and disposed in a region surrounded with the seal 82. In this embodiment, the counter substrate 80 includes a substrate 21, and the substrate 21 has a surface facing the liquid crystal layer 81 and provided with a color filter. Note that the color filter may be provided to a surface of the substrate 10 included in the active matrix substrate 40, and the surface may face the liquid crystal layer 81.

As will be described later, the liquid crystal panel 50 further includes: at least one gate driver; and a plurality of source drivers. The gate driver and the source drivers are arranged in a region other than the display region DR of the substrate 10, and respectively drive the gate bus lines and the source bus lines. In this embodiment, the gate driver and the source drivers are arranged in the non-display region NR.

The control apparatus 90 includes: a substrate 91; and a timing controller 92 mounted on the substrate 91. In this embodiment, the substrate 91 is a flexible substrate. The timing controller 92 is mounted on the substrate 91. The substrate 91 has a terminal connected to the active matrix substrate 40. The timing controller 92 receives a video signal from an external host computer, and generates a scan signal and a data signal. The generated scan signal and data signal are output to the gate driver and the source drivers.

The liquid crystal display device 101 further includes: a pair of polarizing plates 96; and a backlight 95. The pair of polarizing plates 96 is positioned to sandwich the active matrix substrate 40 and the counter substrate 80. The backlight 95 is disposed across from one of the polarizing plates 96 in the pair.

Figure 2:
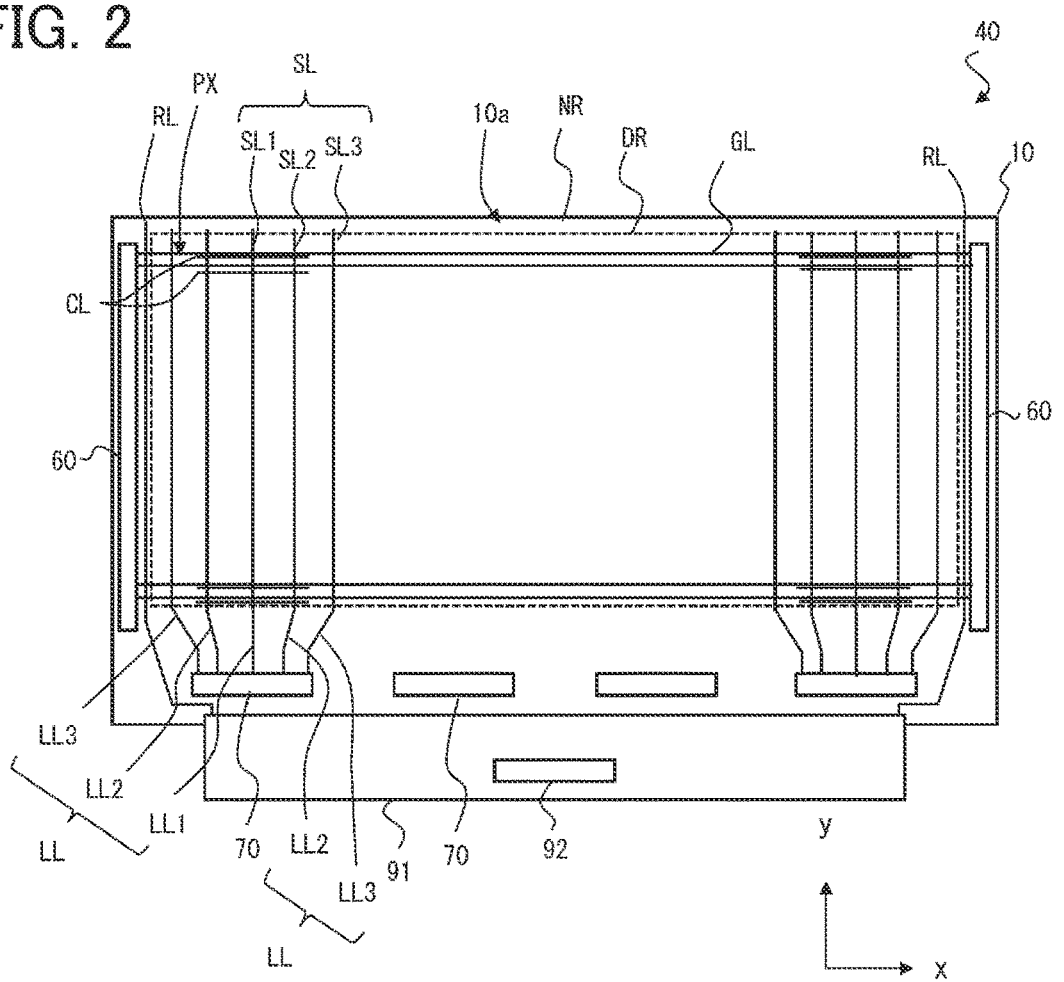
FIG. 2 is a schematic plan view of a configuration of an active matrix substrate for the liquid crystal display device illustrated in FIG. 1.

FIG. 2 is a schematic plan view of an example of the active matrix substrate 40. The main surface 10*a* of the substrate 10 has, as described before, the display region DR and the non-display region NR. The display region in this embodiment is shaped into a rectangle whose longitudinal direction is an x-axis direction. However, the display region may have another shape, such as an oval shape, a polygonal shape, or a rectangle having two rounded upper corners aligned in the x-axis direction. The non-display region NR is positioned around the display region DR. In this embodiment, the non-display region NR surrounds the display region.

The plurality of gate bus lines GL extend in the x-axis direction (in the first direction), and are arranged in a y-axis direction (in a second direction). Furthermore, the plurality of source bus lines SL extend in the y-axis direction, and are arranged in the x-axis direction.

A plurality of capacitance lines CL are arranged in the display region DR to intersect with some of the plurality of source bus lines SL.

Figure 3:
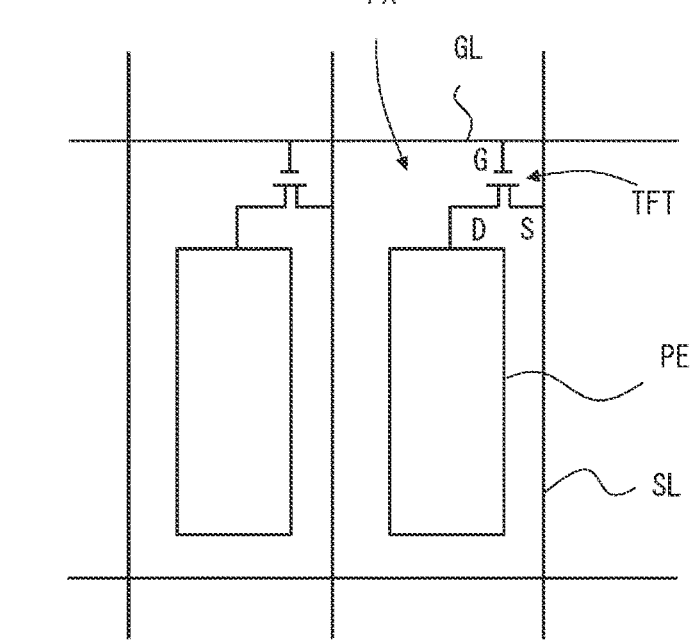
FIG. 3 is a circuit diagram of an exemplary configuration of each pixel for the display device illustrated in FIG. 1.

FIG. 3 is a circuit diagram illustrating an exemplary configuration of a pixel PX. Each pixel PX is disposed in a region surrounded with: a pair of source bus lines SL included in the plurality of source bus lines SL; and a pair of gate bus lines GL included in the plurality of gate bus lines GL. The pixel PX includes: a switch element such as a thin-film transistor (a TFT); and a pixel electrode PE. Specifically, the TFT has: a gate electrode connected to a gate bus line GL; a source electrode connected to a source bus line SL; and a drain electrode connected to the pixel electrode.

Reference is made again to FIG. 2. The at least one gate driver 60 and the plurality of source drivers 70 are arranged out of the display region DR. In this embodiment, the active matrix substrate 40 includes a pair of gate drivers 60 arranged in the non-display region NR across the display region DR from each other.

In this embodiment, the gate drivers 60 are formed monolithically together with the substrate 10. For example, the gate drivers 60 include a plurality of TFTs. These TFTs and the TFTs of the pixels PX are formed simultaneously. Each of the gate drivers 60 may be either a bare chip or a packaged chip, and mounted in the non-display region NR of the substrate 10.

At opposing ends, the plurality of gate bus lines GL reach the non-display region NR, and connect to the gate drivers 60.

Each of the plurality of source drivers 70 is a bare chip or a packaged chip, and mounted in the non-display region NR of the substrate 10. At one end, the plurality of source bus lines SL extend to the non-display region NR, and connect to the source drivers 70 through a plurality of source lead lines LL formed on the substrate 10. In this embodiment, the source drivers 70 are described as four elements. Alternatively, the source drivers 70 may include either one to three source drivers 70 or five or more source drivers 70.

Each of the source lead lines LL is connected to a corresponding one of a plurality of terminals of the source drivers 70. Intervals of the terminals of the source drivers 70 are different from intervals of the source bus lines SL arranged in the x-axis direction. More specifically, the intervals of the terminals of the source drivers 70 are narrower than the intervals of the source bus lines SL arranged in the x-axis direction. Hence, as to the plurality of source lead lines LL, a source lead line LL is at least partially different in length; that is, a distance along a source lead line LL from a connecting portion of the source lead line LL and a source driver 70 to a connecting portion of the source lead line LL and a source bus line SL, from another source lead line LL. Hereinafter, this distance is also simply referred to as a length of a source lead line.

In this embodiment, the plurality of source lead lines LL include: at least one first source lead line LL1; at least one second source lead line LL2; and at least one third source lead line LL3. Wherein $l1$, $l2$, and $l3$ respectively represent a length of the first source lead line LL1, a length of the second source lead line LL2, and a length of the third source lead line LL3, a relationship of $l1<l2<l3$ holds. Furthermore, wherein $c1$, $c2$, and $c3$ respectively represent a parasitic capacitance of the first source lead line LL1, a parasitic capacitance of the second source lead line LL2, and a parasitic capacitance of the third source lead line LL3, a relationship of $c1<c2<c3$ holds, depending on the length of each of the source lead lines. These parasitic capacitances include: a parasitic capacitance formed between two adjacent or overlapping source lead lines LL; and a parasitic capacitance formed in an overlap between a source lead line LL and a common electrode to be described later in the non-display region NR.

Moreover, wherein $r1$, $r2$, and $r3$ respectively represent a resistance of the first source lead line LL1, a resistance of the second source lead line LL2, and a resistance of the third source lead line LL3, a relationship of $r1<r2<r3$ holds, depending on the length of each of the source lead lines. When the parasitic capacitance and the resistance of a source lead line LL are large, a time constant (i.e., a product of the parasitic capacitance and the resistance) increases, and a large distortion is likely to be observed in a data signal supplied from a source driver 70 through the source lead line LL to a source bus line SL. As a result, stripe-patterned brightness unevenness is likely to appear. The brightness unevenness due to the distortion of the data signal could be reduced by correction of the data signal and adjustment of a common signal to be supplied to a common electrode. However, in such cases where a large difference is observed in the distortion of the data signal and where there are many source bus lines SL with which a large difference is observed in the distortion of the data signal, it is difficult to correct the data signal and to adjust the common signal.

The plurality of source lead lines LL may include one or more of, or alternately, two or more of, the first source lead lines LL1, the second source lead lines LL2, and the third source lead lines LL3.

The plurality of source bus lines SL include: at least one first source bus line SL1; at least one second source bus line SL2; and at least one third source bus line SL3. The first source bus line SL1 is connected to the first source lead line LL1, the second source bus line SL2 is connected to the second source lead line LL2, and the third source bus line SL3 is connected to the third source lead line LL3.

The plurality of source bus lines SL partially intersects with the capacitance lines CL to form parasitic capacitance. Wherein $cc1$ represents a parasitic capacitance formed with the first source bus line SL1 and the plurality of capacitance lines CL and $cc2$ represents a parasitic capacitance formed with the second source bus line SL2 and the plurality of capacitance lines CL, $cc1$ is larger than $cc2$. That is, a relationship of $cc1>cc2$ holds. Such a feature can form different parasitic capacitances for the first source bus line SL1 and the second source bus line SL2 respectively connected to the first source lead line LL1 and the second source lead line LL2, and reduce the difference caused between the parasitic capacitances because of the difference in length between the first source lead line LL1 and the second source lead line LL2. A structure of the active matrix substrate 40 will be described in detail below.

Figure 4:
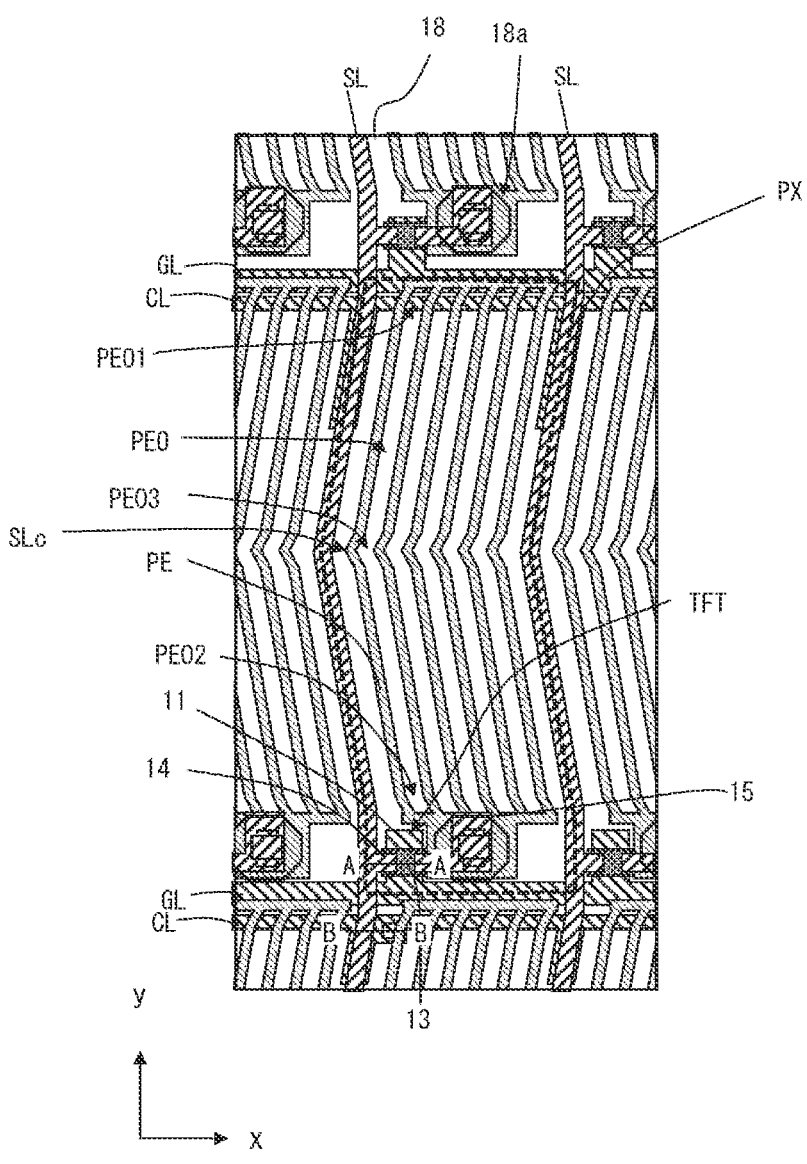
FIG. 4 is a plan view of an essential configuration of the active matrix substrate for one pixel.
Figure 5:
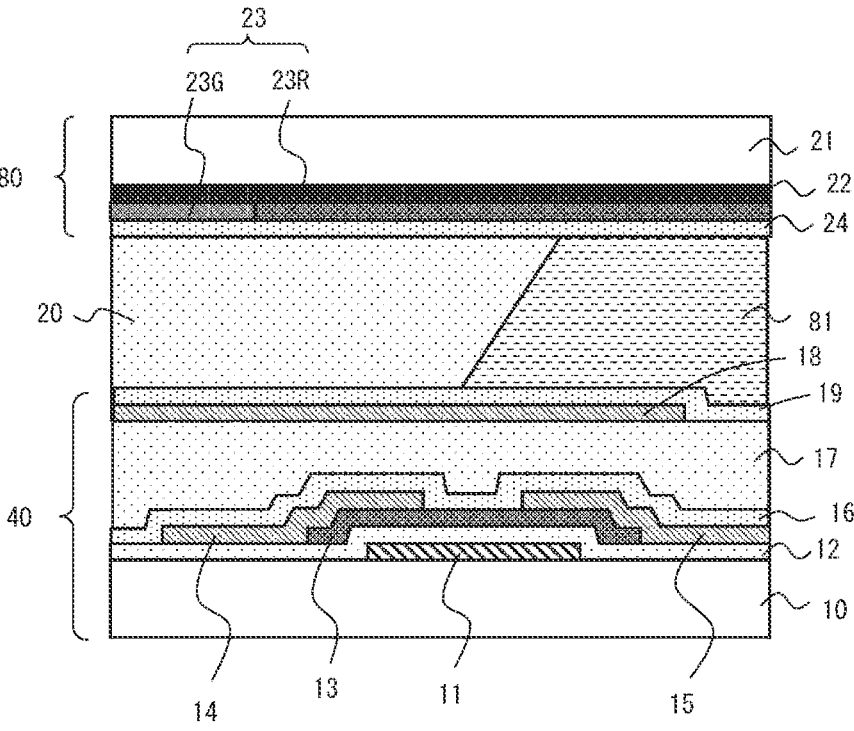
FIG. 5 is a cross-sectional view of a liquid crystal panel, taken along line A-A in FIG. 4.
Figure 5:
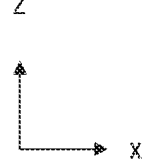
Figure 6:
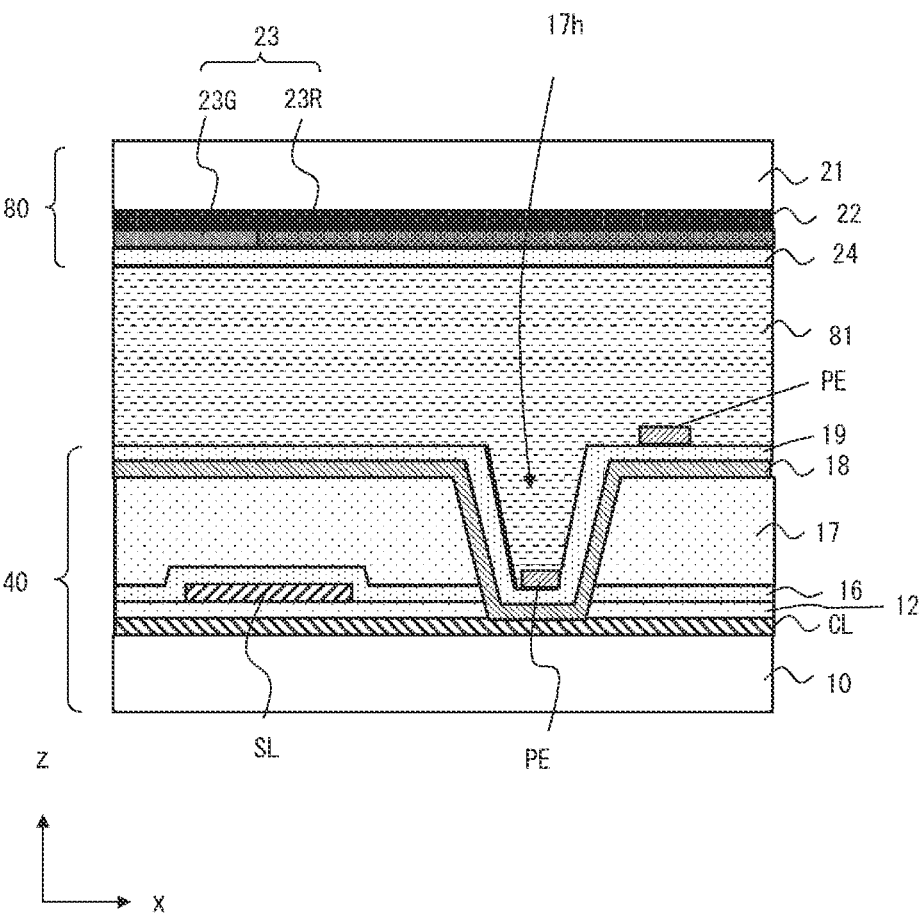
FIG. 6 is a cross-sectional view of the liquid crystal panel, taken along line B-B in FIG. 4.

FIG. 4 is a plan view of an essential configuration of the active matrix substrate 40 for one pixel. FIG. 4 illustrates essential metal layers, conductive layers, and semiconductor layers. FIGS. 5 and 6 are cross-sectional views of the liquid crystal panel 50, taken along line A-A and line B-B in FIG. 4.

The line A-A cross-section shows that the active matrix substrate 40 includes: a gate electrode 11; that is, a portion of a bus line GL, disposed on the substrate 10; and a gate insulating layer 12 disposed on the substrate 10 to cover the gate electrode 11 and the gate bus line GL. On the gate insulating layer 12, a semiconductor layer 13 is positioned. On the semiconductor layer 13, a drain electrode 15 and a source electrode 14 are positioned. The source electrode 14 is a portion of a source bus line SL.

An insulating layer 16 is disposed above a gate insulating layer 12 to cover the source bus line SL including the source electrode 14, and to cover the drain electrode 15 and the semiconductor layer 13. Furthermore, on the insulating layer 16, a planarization layer 17 is disposed. On the planarization layer 17, a common electrode 18 is disposed.

An insulating layer 19 is disposed above the planarization layer 17 to cover the common electrode 18. Moreover, on the insulating layer 19, a pixel electrode PE is positioned. (See FIG. 6.) Each of the gate bus line GL and the source bus line SL is formed of either: a monolayer film made of one metal material selected from such metal materials as copper, titanium, aluminum, molybdenum, and tungsten; or a multilayer film or an alloy made of the metal materials in different kinds. Hence, the gate bus line GL and the source bus line SL are electrically conductive and impervious to light. In addition, the common electrode 18 and the pixel electrode PE are made of a transparent conductive material (e.g., indium tin oxide (TO) or indium zinc oxide (IZO)). Furthermore, if the liquid crystal display device 101 is of either a reflective type or a semi-transmissive type, the common electrode 18 and the pixel electrode PE may contain a highly-reflective metal material such as aluminum or silver.

Moreover, the counter substrate 80 includes a black matrix 22 disposed on the substrate 21, and further includes a color filter 23. The color filter 23 is colored, for example, red, blue, or green for each pixel. FIGS. 5 and 6 illustrate a green color filter 23G and a red color filter 23R. On the color filter 23, an overcoat layer 24 is disposed.

Both line A-A and line B-B are positioned to be covered with the black matrix 22, and, in FIGS. 5 and 6, the color filter 23 is positioned on the black matrix 22. However, the black matrix 22 is not disposed in an opening region of the pixel, and the color filter 23 is formed on the substrate 21.

As illustrated in FIG. 4, a gate bus lines GL extends in the x-axis direction, and the gate electrode 11 extends toward the inside of each pixel PX (a region surrounded by a broken line).

For each pixel PX, a source bus line SL extends in parallel with the y-axis in a region adjacent to a TFT. Furthermore, the source electrode 14 extends toward the inside of each pixel PX. The source bus line SL has a bending portion SLc in a center of each pixel in the y-axis direction. The bending portion SLc changes the direction in which the source bus line SL extends. Hence, in a region adjacent to an opening portion of each pixel, the source bus line SL is bent into a V-shape (i.e., in a dog-leg shape). The source bus line SL extends in parallel with the y-axis as a whole, while bending at the bending portion SLc at an angle of, for example, 3° to 20° with respect to the y-axis.

The pixel electrode PE has a plurality of opening portions PEO shaped into slits, extending in the y-axis direction, and arranged in the x-axis direction. Each of the opening portions PEO has: a first bending portion PEO1 and a second bending portion PEO2 disposed near the respective gate bus lines GL in a pair; and a third bending portion PEO3 positioned between the first bending portion PEO1 and the second bending portion PEO2. In the first bending portion PEO1, the second bending portion PEO2, and the third bending portion PEO3, the slits change the directions to extend.

The pixel electrode PE is connected to the drain electrode 15 through a contact hole provided to the insulating layer 19, the planarization layer 17, and the insulating layer 16. Here, the second bending portion PEO2 represents a bending portion near a gate bus line GL corresponding to a TFT including a drain electrode 15 connected to a certain pixel electrode PE, and the first bending portion PEO1 represents a bending portion near a gate bus line GL adjacent to the gate bus line GL corresponding to the TFT having the drain electrode 15 connected to the certain pixel electrode PE.

In plan view, the common electrode 18 continuously overlaps at least the entire opening portion PEO of each pixel electrode PE. In this embodiment, the common electrode 18 extends over each pixel PX, and connects to the common electrode 18 of an adjacent pixel PX. Thus, the common electrode 18 covers the entire display region DR. The common electrode 18 is provided with an opening 18a through which a portion of the drain electrode 15 is exposed for connecting together the pixel electrode PE and the drain electrode 15 in each pixel PX. As illustrated in FIG. 2, the common electrode 18 is connected to a common wire RL in the non-display region NR, and supplied with a common potential from the control apparatus 90.

A spacer 20 is disposed between the counter substrate 80 and the active matrix substrate 40. Furthermore, the liquid crystal layer 81 is disposed in the clearance between the counter substrate 80 and the active matrix substrate 40.

In the pixel having the above configuration, when a data signal is written through the TFT to the pixel electrode PE, a difference in potential is produced between the pixel electrode PE and the common electrode 18 overlapping with the pixel electrode PE. Then, between an opening edge of the opening portion PEO included in the pixel electrode PE and the common electrode 18, a fringe field (an oblique electric field) including a component in the direction normal to the main surface of the array substrate 40 is generated, in addition to a component along the main surface of the array substrate 40. This fringe field is used to successfully control an orientation direction of the liquid crystal molecules contained in the liquid crystal layer 81. That is, an operation mode of the liquid crystal display panel 101 according to this embodiment is set to the fringe field switching (FFS) mode.

Figure 7:
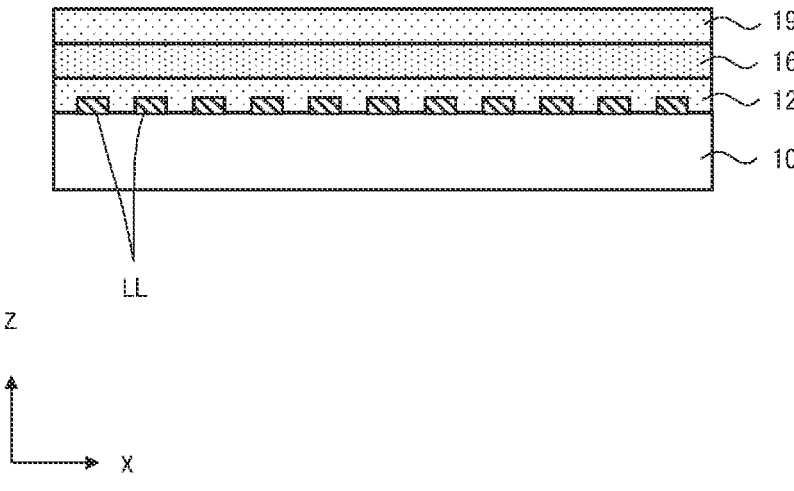
FIG. 7 is a schematic view of a cross-sectional structure of source lead lines.

The source lead lines LL arranged in the non-display region NR of the active matrix substrate 40 can be configured in various aspects. FIGS. 7 to 11 are schematic views of cross-sectional structures of the source lead lines LL. As illustrated in FIG. 7, the plurality of source lead lines LL may be arranged, for example, on the substrate 10 and under the gate insulating layer 12. In this case, the source lead lines LL can be formed of the same metal layer as the metal layers forming the gate bus lines GL and the capacitance lines CL.

Figure 8:
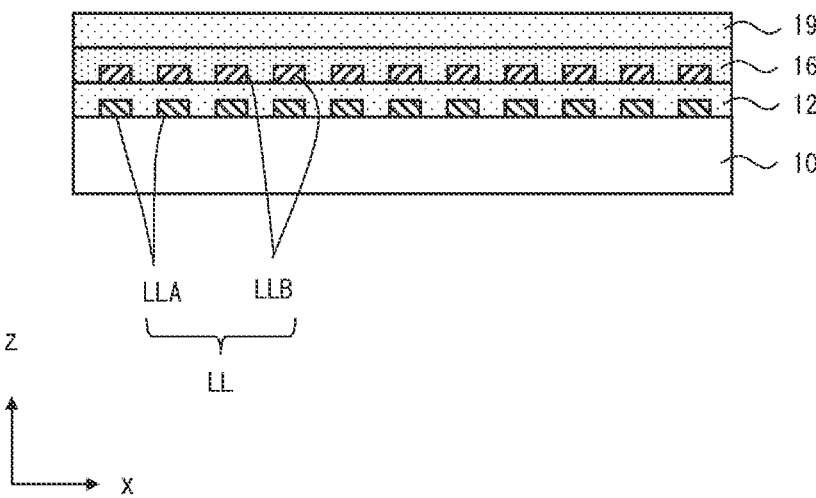
FIG. 8 is a schematic view of a cross-sectional structure of source lead lines.
Figure 9:
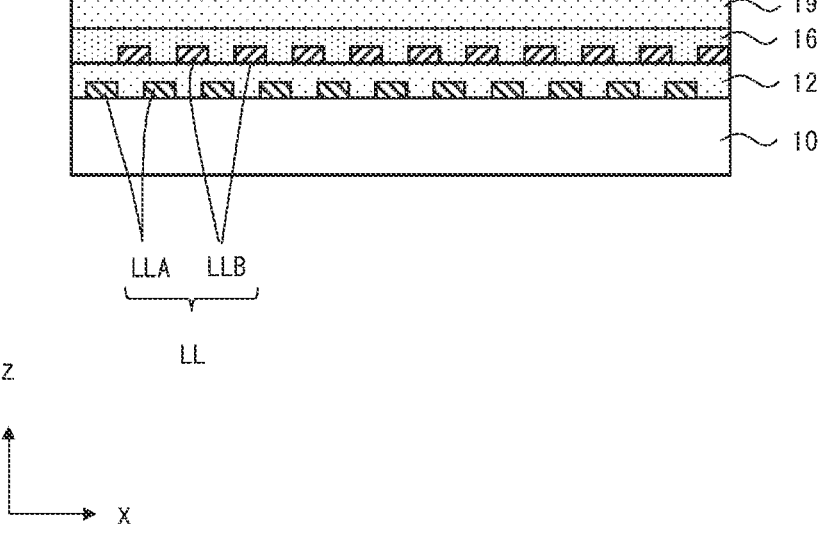
FIG. 9 is a schematic view of a cross-sectional structure of source lead lines.

As illustrated in FIGS. 8 and 9, the plurality of source lead lines LL may include, for example: a line LLA disposed on the substrate 10 and under the gate insulating layer 12; and a line LLB disposed on the gate insulating layer 12 and under the insulating layer 16. In this case, the line LLA can be configured as described above. Furthermore, the line LLB can be formed of the same metal layer as the metal layers forming the source bus lines SL and the drain electrode 15. In this case, the line LLA and the line LLB may overlap with each other in a stacking direction. Alternatively, the line LLB may be displaced from the line LLA in the x-axis direction not to overlap with the line LLA.

Figure 10:
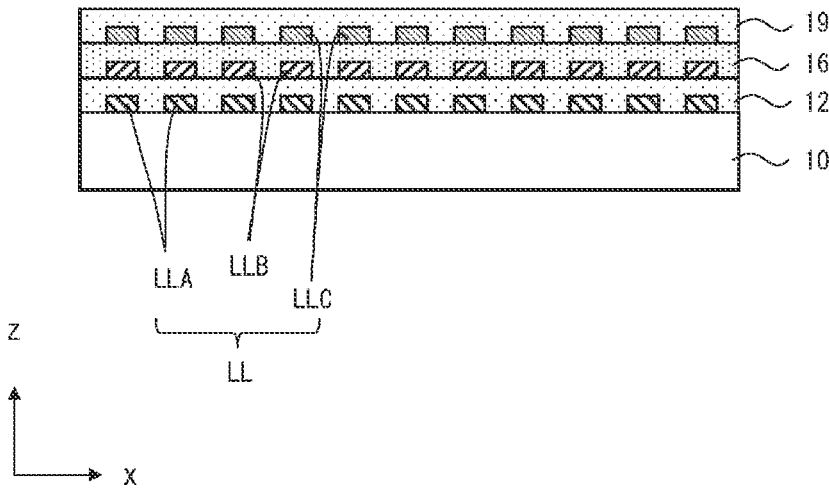
FIG. 10 is a schematic view of a cross-sectional structure of source lead lines.
Figure 11:
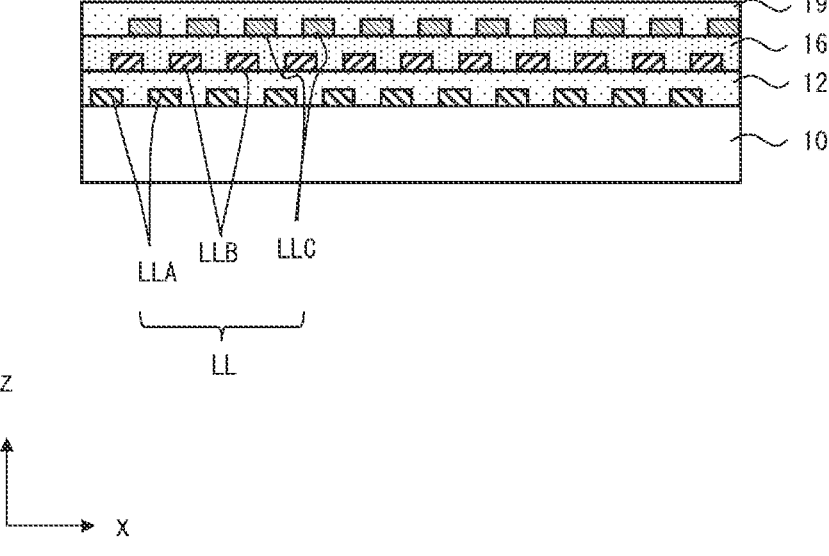
FIG. 11 is a schematic view of a cross-sectional structure of source lead lines.

Moreover, as illustrated in FIGS. 10 and 11, the plurality of source lead lines LL may include, for example: the line LLA disposed on the substrate 10 and under the gate insulating layer 12; the line LLB disposed on the gate insulating layer 12 and under the insulating layer 16; and a line LLC disposed on the insulating layer 16 and under the insulating layer 19. In this case, the line LLA and the line LLB can be configured as described above. The line LLC can be formed of, for example, the same conductive layer and metal layer as the conductive layer and the metal layer forming the common electrode 18. In addition, the line LLC may be formed of the same metal layer as a metal layer (which could be provided to reduce distribution of resistance in the display region DR of the common electrode 18) provided in direct contact with the common electrode 18. Furthermore, the line LLC may be disposed between the substrate 10 and an insulating layer additionally provided under the line LLA. The line LLA, the line LLB, and the line LLC may overlap with one another in a stacking direction. Alternatively, the line LLB and the line LLC may be displaced with respect to the line LLA in the x-axis direction not to partially overlap with one another.

As can be seen, the source lead lines LL are partially formed of one metal layer or a plurality of different metal layers. Hence, the source lead lines LL formed of different metal layers can be arranged at different levels in a height direction. Hence, such a feature can keep the plurality of source lead lines LL from contact with one another even if, for example, the source lead lines LL are arranged at narrow pitches. Furthermore, the source lead lines LL can be increased in width to reduce resistance of the source lead lines LL.

Moreover, the plurality of source lead lines LL have at least portions partially or entirely overlap with one another in plan view to form parasitic capacitance. Hence, parasitic capacitance of a source lead line LL overlapping with another source lead line LL is likely to be larger than parasitic capacitance of a source lead line LL not overlapping with another source lead line LL. Note that, when the plurality of source lead lines LL overlap with one another, parasitic capacitance is appropriately formed partially or entirely on the source lead lines LL. Such a feature can adjust the parasitic capacitance of the source lead lines LL.

Figure 12:
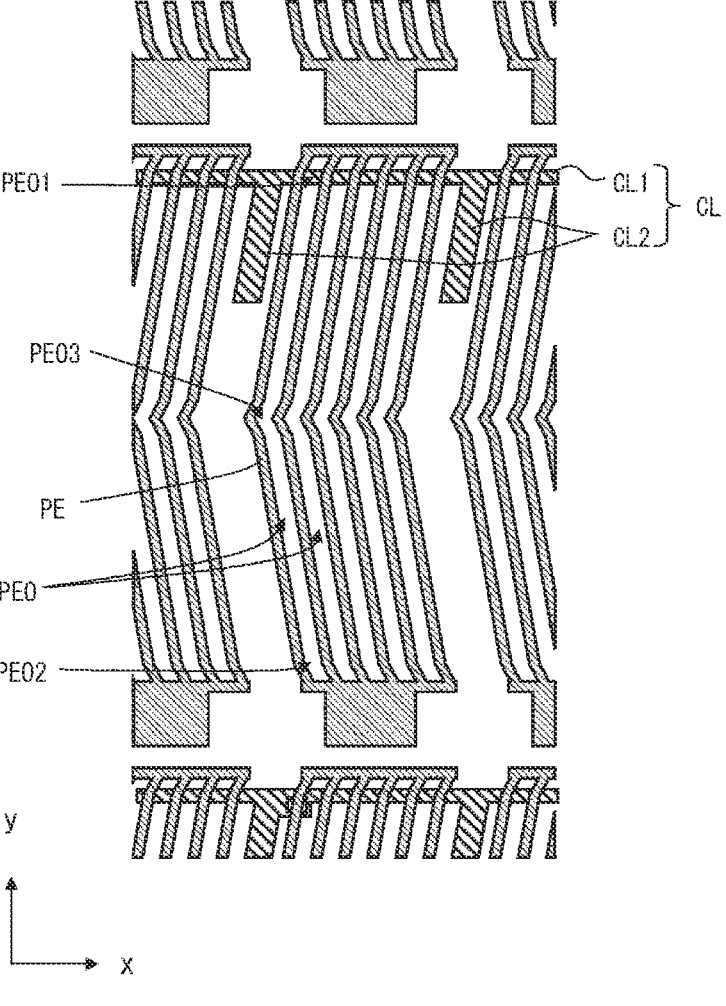
FIG. 12 is a plan view of a capacitance line and a pixel electrode.
Figure 13:
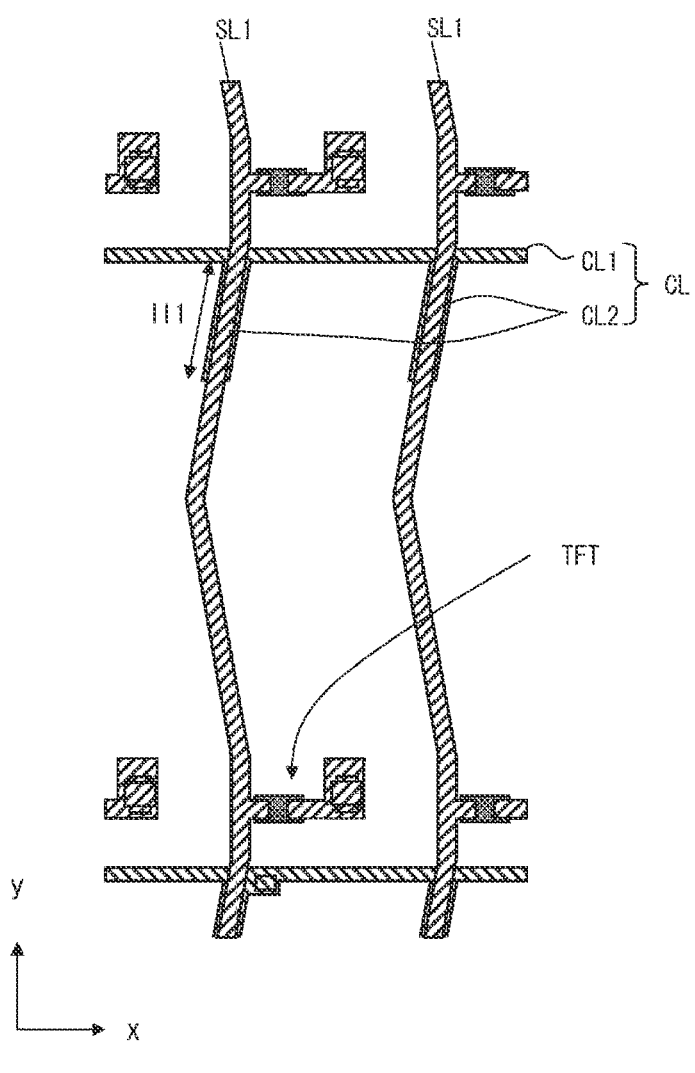
FIG. 13 is a plan view of a capacitance line and source bus lines.
Figure 14:
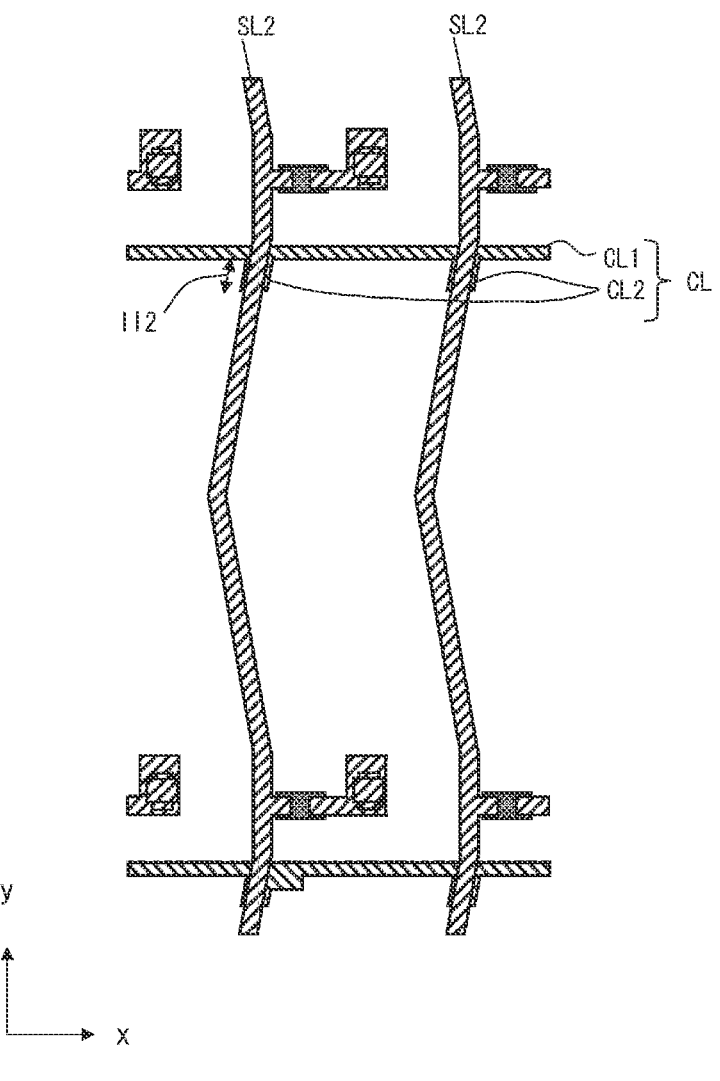
FIG. 14 is a plan view of a capacitance line and source bus lines.
Figure 15:
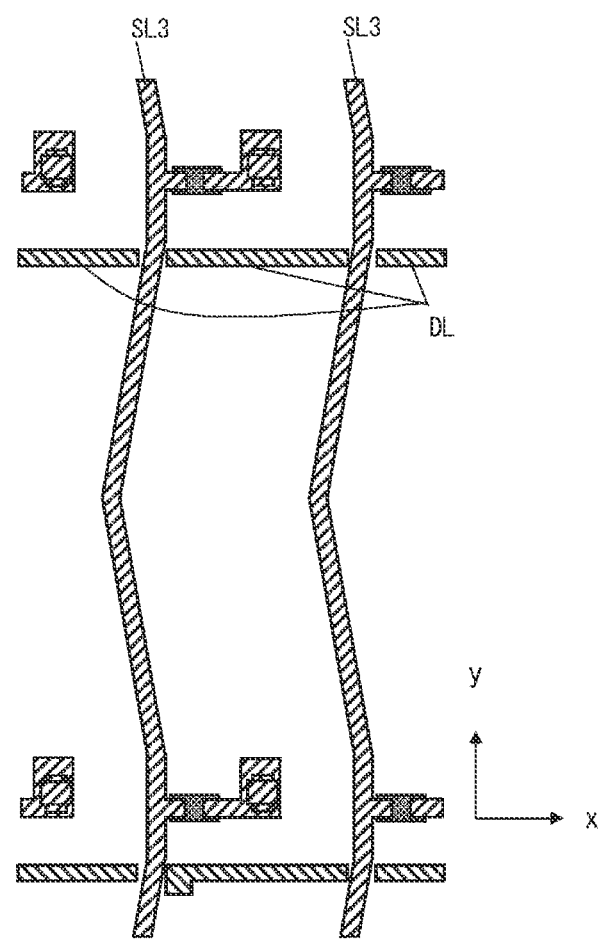
FIG. 15 is a plan view of a capacitance line and source bus lines.

Next, the capacitance lines CL will be described. FIG. 12 is a plan view of a capacitance line CL and a pixel electrode PE. FIGS. 13, 14, and 15 are plan views of the capacitance line CL and source bus lines SL.

The capacitance line CL has: a first portion CL1 extending in the x-axis direction; and a plurality of second portions CL2 extending, in a direction in which the source bus lines SL extend, at intersections with the source bus lines SL. The plurality of second portions CL2 overlap with the source bus lines SL. The capacitance line CL is formed of, for example, the same metal layer as the metal layers of the gate electrode 11 and the gate bus line GL, and may include the same metal layers. In this case, the capacitance line CL does not intersect with the gate bus line GL, and the gate insulating layer 12 is positioned between the source bus line SL and the capacitance line CL.

The capacitance line CL can be formed using a metal layer different from metal layers of the gate electrode 11 and the gate bus line GL. For example, a line formed of a metal layer may be provided through an insulating layer to a layer different from any of the gate bus line GL, the source bus line SL, the common electrode 18, and the pixel electrode PE. The line serves either as a line to reduce distribution of resistance in the common electrode 18, or as a touch sensor line if the liquid crystal display device includes a touch sensor function. The same metal layer as this metal layer can be used to form the capacitance line CL.

The capacitance line CL is preferably positioned to overlap with either the first bending portion PEO1 or the second bending portion PEO2 of the opening portion PEO of the pixel electrode PE in each of the pixels PX arranged in the x-axis direction. In this embodiment, the capacitance line CL is disposed in the first bending portion PEO1 provided to each of the pixels PX arranged in the x-axis direction.

As illustrated in FIGS. 4 and 6, the capacitance line CL is connected to the common electrode 18 through a contact hole 17h provided to the planarization layer 17 and the insulating layer 16. The contact hole 17h connecting together each capacitance line CL and the common electrode 18 may be provided in at least one position in the display region DR. However, in order to achieve redundancy in connection with the capacitance lines CL and to reduce distribution of resistance in the common electrode 18, a plurality of the contact holes 17h may be provided in a plurality of positions including the vicinities of the opposing ends of the capacitance lines CL. Furthermore, in a region in which the contact hole 17h is formed, an orientation direction of the liquid crystal is likely to be misaligned to cause afterimage. Hence, the contact hole 17h is provided preferably in a region overlapping with the black matrix 22. In the vicinity of the spacer 20, the orientation of the liquid crystal is likely to be misaligned. Thus, the black matrix 22 is provided on the substrate 21 of the counter substrate 80 to overlap with the spacer 20. The contact hole 17h may be disposed in the vicinity of the spacer 20 so that the black matrix 22 does not occupy a large area.

Along the source bus lines SL, the lengths of the second portions CL2 in the capacitance line CL vary, depending on the type of the source bus lines SL with which the second portions CL2 overlap. As illustrated in FIGS. 13 and 14, wherein ll1 is a length of the second portions CL2 overlapping with the first source bus lines SL1 along the first source bus lines, and ll2 is a length of the second portion CL2 overlapping with the second source bus lines SL2 along the second source bus lines, a relationship of ll1>ll2 holds.

A width of the second portion CL2 perpendicular to a direction in which the second portion CL2 extends may be either the same as, or different from, a width of the source bus line SL. In view of efficiently generating the parasitic capacitance, the width of the second portion CL2 is preferably the same as the width of the source bus line SL. Moreover, at a producing step, widths could vary among the source bus lines SL and among the second portions CL2, and positions of the source bus lines SL may be misaligned with respect to the second portions CL2. Taking such issues into consideration, the widths of the second portions CL2 may be set greater than the widths of the source bus lines SL by approximately, for example, 1 to 2 μm.

In addition, as illustrated in FIG. 15, the capacitance lines CL do not intersect with the third source bus lines SL3. Hence, no parasitic capacitance is generated by the intersection of the third source bus lines SL3 with the capacitance lines CL. On the other hand, in this embodiment, the active matrix substrate 40 includes a plurality of dummy wires DL adjacent to the third source bus lines SL3. Each of the dummy wires DL extends in the x-axis direction, and is adjacent to the third source bus line SL3. Furthermore, each dummy wire DL is a direct extension of a corresponding one of the plurality of capacitance lines CL, and intersects with none of the source bus lines SL.

The dummy wires DL do not intersect with the source bus lines SL, and hardly contribute to an increase in the parasitic capacitance of the source bus lines SL. Whereas, the dummy wires DL are direct extensions of the respective capacitance lines CL. Such a feature can reduce a difference in aperture ratio between a pixel provided with a capacitance line CL and a pixel provided with no capacitance line CL.

As described above, the length l2 of the second source lead line LL2 is greater than the length l1 of the first source lead line LL1. Hence, the resistance r2 of the second source lead line LL2 is greater than the resistance r1 of the first source lead line LL1 (r1<r2), and the parasitic capacitance c2 of the second source lead line LL2 is greater than the parasitic capacitance c1 of the first source lead line LL1 (c1<c2).

Whereas, as to each of the capacitance lines CL, the length ll1 of a second portion CL2 overlapping with a first source bus line SL1 is greater than the length ll2 of a second portion CL2 overlapping with a second source bus line SL2 (ll1>ll2). Here, in overlaps with the second portion CL2, a width of the first source bus line SL1 is the same as a width of the second source bus line SL2. Hence, an area in which the source bus line SL and the second portion CL2 overlap with each other is proportional to the length of the second portion CL2, and an area in which the second source bus line SL2 and the second portion CL2 overlap with each other is smaller than the area in which the first source bus line SL1 and the second portion CL2 overlap with each other. That is, the area in which the second source bus line SL2 and each capacitance line CL overlap with each other is smaller than the area in which the first source bus line SL1 and each capacitance line CL overlap with each other. Hence, the parasitic capacitance cc2 formed with the second source bus line SL2 and the plurality of capacitance lines CL is smaller than the parasitic capacitance cc1 formed with the first source bus line and the plurality of capacitance lines CL (cc1>cc2).

The first source lead line LL1 and the second source lead line LL2 are respectively connected to the first source bus line SL1 and the second source bus line SL2. Hence, in order to reduce the difference in parasitic capacitance between the first source lead line LL1 and the second source lead line LL2, each of the capacitance lines CL forms parasitic capacitance between the first source bus line SL1 and the second source bus line SL2.

Note that, as a technique to make the parasitic capacitance of the first source bus line SL1 greater than the parasitic capacitance of the second source bus line SL2, the width of the first source bus line SL1 could be set greater than the width of the second source bus line SL2 in overlaps with the second portion CL2. However, in this case, the resistance of the first source bus line SL1 becomes lower than the resistance of the second source bus line SL2, and, because of the difference in resistance value, a difference could be observed in distortion of a data signal. Furthermore, in a case of a liquid crystal display device having a configuration in which the common electrode 18 is disposed above the pixel electrode PE (i.e., disposed closer to the liquid crystal layer 81), parasitic capacitance between the first source bus line SL1 and a pixel electrode PE adjacent to the first source bus line SL1 is larger than parasitic capacitance between the second source bus line SL2 and a pixel electrode PE adjacent to the second source bus line SL2. This case could readily cause a display defect such as shadowing. Hence, as described above, in the overlaps with the second portion CL2, the width of the first source bus line SL1 is preferably the same as the width of the second source bus line SL2.

Furthermore, each capacitance line CL is connected to the common electrode 18, and maintained at a constant potential. Hence, even if a data signal is applied to the pixel electrode or a source bus line when the liquid crystal display device is driven, such a feature reduces variations in parasitic capacitance because of the capacitance line.

This capacitance line CL is disposed either in the first bending portion PEO1 or in the second bending portion PEO2 of each of the pixels arranged in the x-axis direction. The pixel electrode PE includes the opening portion PEO shaped into a slit and having a bending portion. The bending portion causes misalignment in the orientation of the liquid crystal, which makes it difficult to transmit light in a correct level corresponding to a voltage to be applied to the pixel. As a result, the bending portion does not contribute much to the luminance of each pixel. Hence, either the first bending portion PEO1 or the second bending portion PEO2 is provided with the capacitance line CL. Even if such a feature might reduce an aperture ratio of a pixel, the feature can reduce substantial influence on the luminance of the pixel.

Furthermore, the length l3 of the third source lead line LL3 is greater than the length l2 of the second source lead line LL2. Hence, the resistance r3 of the third source lead line LL3 is greater than the resistance r2 of the second source lead line LL2 (r2<r3), and the parasitic capacitance c3 of the third source lead line LL3 is greater than the parasitic capacitance c2 of the second source lead line LL2 (c2<c3).

Whereas, each of the capacitance lines CL does not overlap with the third source bus line SL3. Hence, the parasitic capacitance cc3 formed with the third source bus line SL3 and the plurality of capacitance lines CL is smaller than the parasitic capacitance cc2 formed with the second source bus line and the plurality of capacitance lines CL (cc2>cc3).

It can be said that the capacitance lines CL form the parasitic capacitance with the second source bus line SL2 so that, when the second source lead line LL2 and the third source lead line LL3 are respectively connected to the second source bus line SL2 and the third source bus line SL3, the difference in parasitic capacitance is reduced between the second source lead line LL2 and the third source lead line LL3.

Second Embodiment

Figure 16:
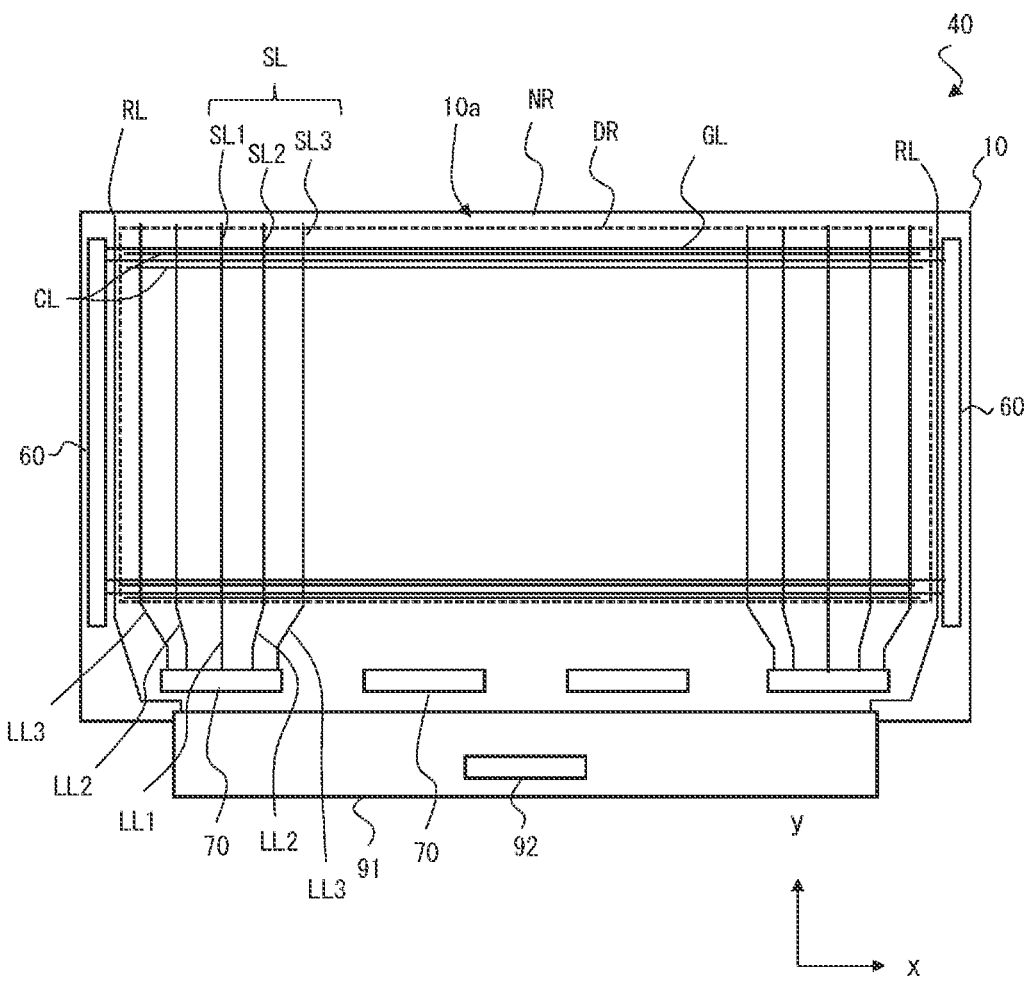
FIG. 16 is a schematic plan view of a configuration of an active matrix substrate for a liquid crystal display device according to a second embodiment.

FIG. 16 is a plan view of an example of the active matrix substrate 40 for a liquid crystal display device 102 of this embodiment. The liquid crystal display device of this embodiment differs from the liquid crystal display device 101 of the first embodiment in that each of the capacitance lines CL intersects also with the third source bus line SL3.

As illustrated in FIG. 16, each capacitance line CL intersects with all of the first source bus line SL1, the second source bus line SL2, and the third source bus line SL3. Specifically, each capacitance line CL extends from one end to another other end of the display region DR in the x-axis direction, in order to intersect with all the source bus lines SL arranged in the display region. In this embodiment, the liquid crystal display device 102 does not include any the dummy wires DL.

Figure 17:
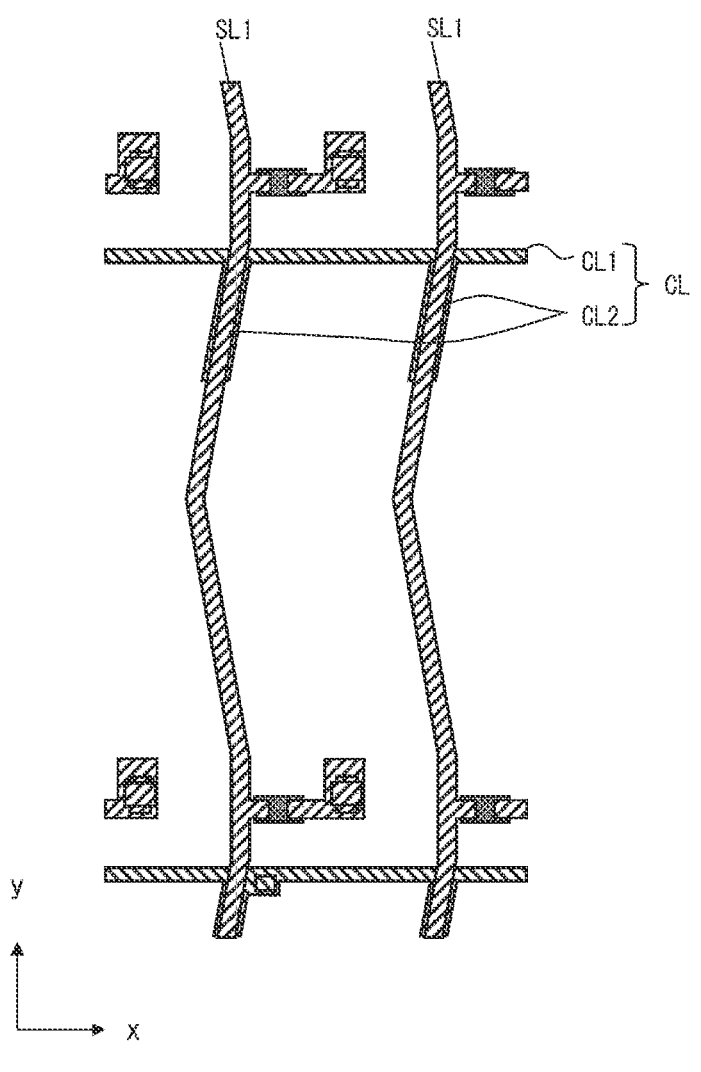
FIG. 17 is a plan view of a capacitance line and source bus lines.
Figure 18:
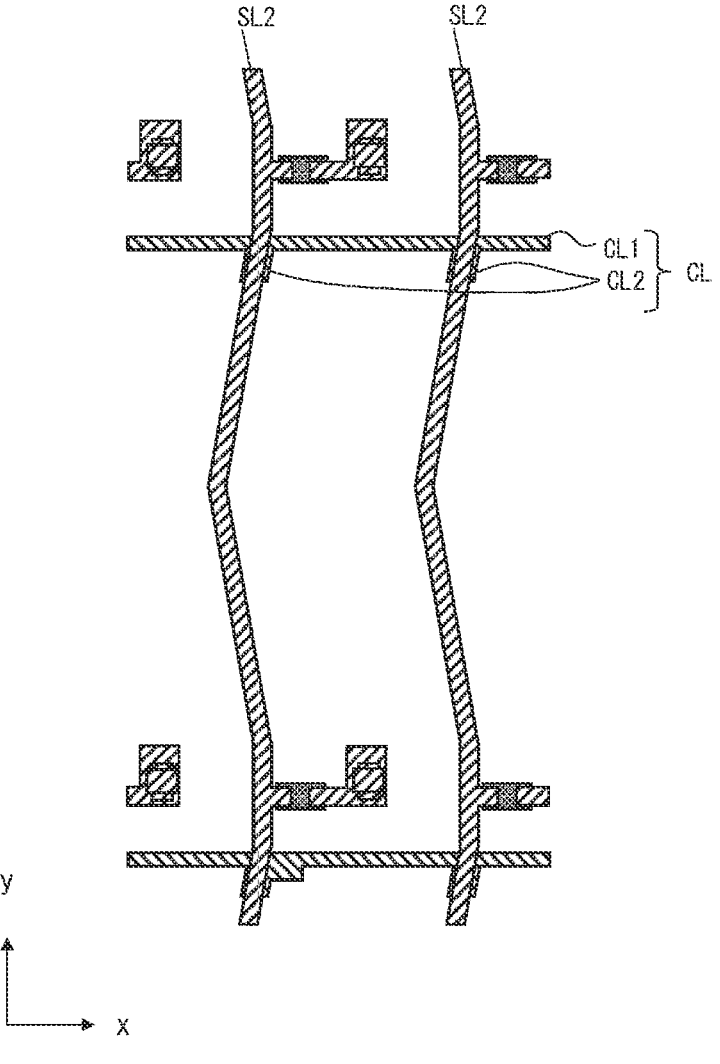
FIG. 18 is a plan view of a capacitance line and source bus lines.
Figure 19:
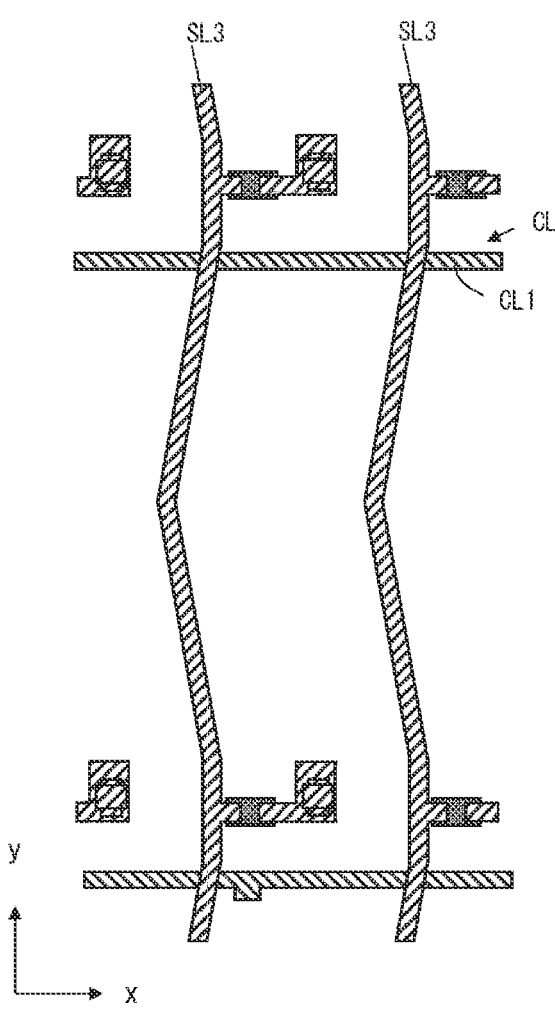
FIG. 19 is a plan view of a capacitance line and source bus lines.

FIGS. 17, 18, and 19 are plan views illustrating how a capacitance line CL and source bus lines SL are positioned. As illustrated in FIGS. 17 and 18, as seen in the first embodiment, the capacitance line CL has the second portions CL2 at intersections with the first source bus lines SL1 and with the second source bus line SL2.

As illustrated in FIG. 19, each capacitance line CL has the first portion CL1 intersecting with the third source bus lines SL3. At an intersection with each third source bus line SL3, the capacitance line CL does not have the second portions extending in a direction in which the third source bus line extends. Here, in the overlaps with the capacitance line CL, a width of the second source bus line SL2 is the same as a width of the third source bus line SL3. Hence, an area in which the third source bus line SL3 and the capacitance line CL overlap with each other is smaller than an area in which the second source bus line SL2 and the capacitance line CL overlap with each other. Hence, the parasitic capacitance cc3 formed with the third source bus line and the plurality of capacitance lines CL is smaller than the parasitic capacitance cc2 formed with the second source bus line and the plurality of capacitance lines CL (cc2>cc3).

Hence, as seen in the first embodiment, in order to reduce the difference in parasitic capacitance between the second source lead line LL2 and the third source lead line LL3, each of the capacitance lines CL forms parasitic capacitance between the second source bus line SL2 and the third source bus line SL3.

In the above embodiment, each capacitance line CL is disposed in the first bending portion PEO1 provided to each of the pixels PX arranged in the x-axis direction. Whereas, each capacitance line CL may be disposed in the second bending portion PEO2.

Figure 20:
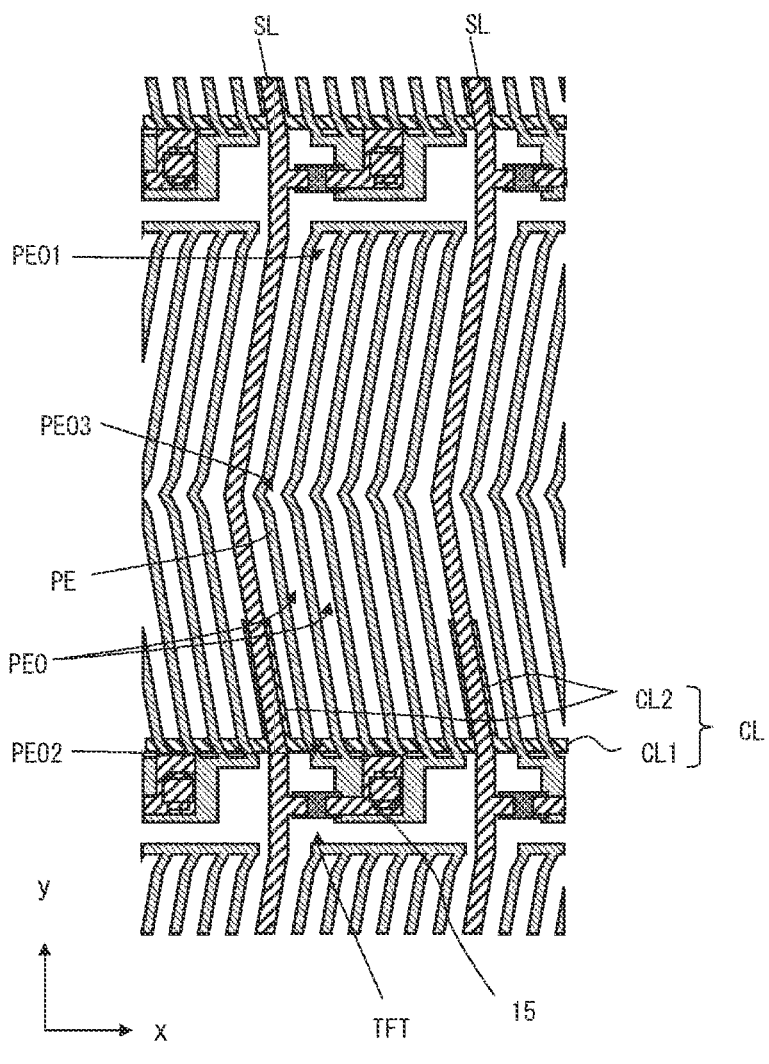
FIG. 20 is a plan view of a pixel electrode, source bus lines, and a capacitance line in another example of the second embodiment.
Figure 21:
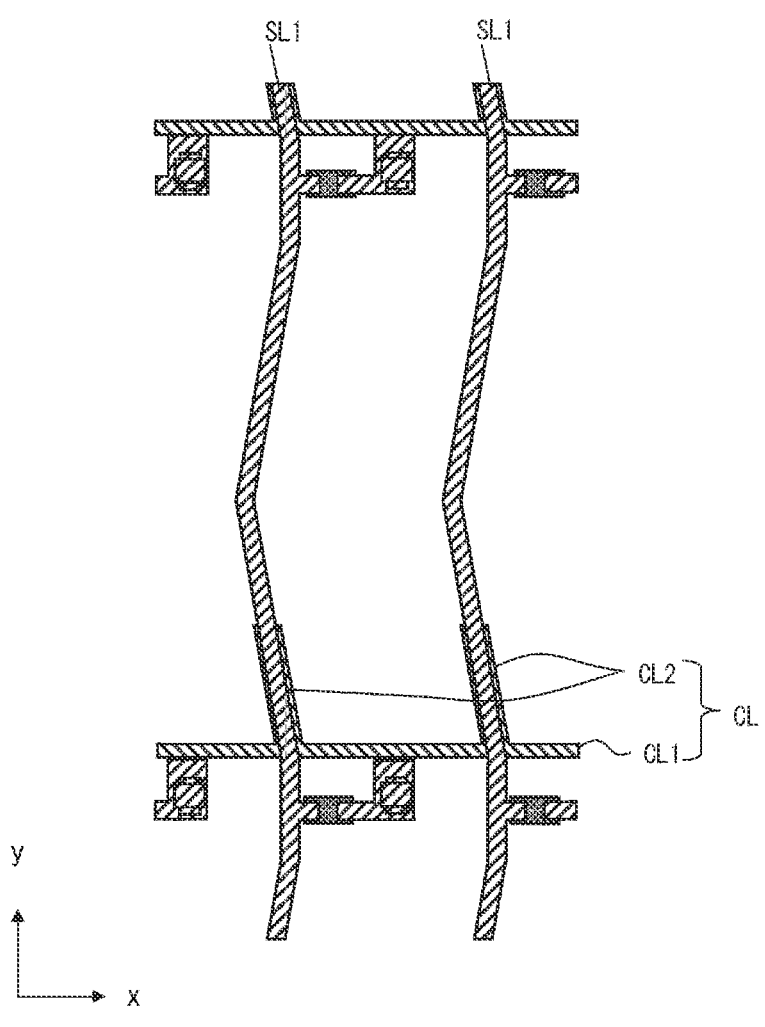
FIG. 21 is a plan view of a capacitance line and source bus lines.
Figure 22:
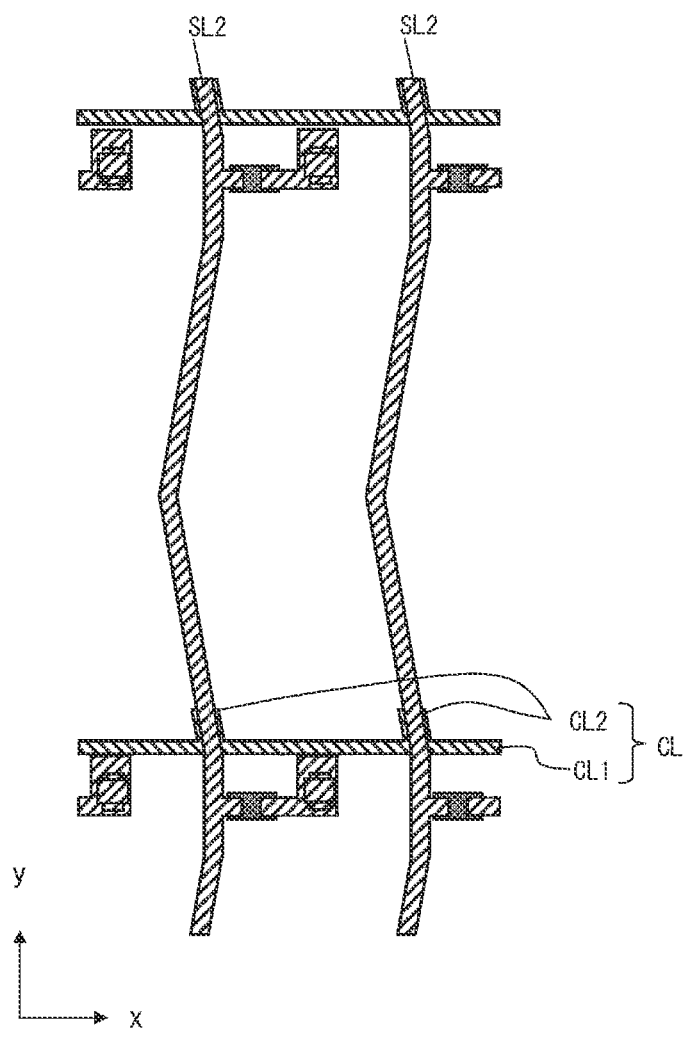
FIG. 22 is a plan view of a capacitance line and source bus lines.
Figure 23:
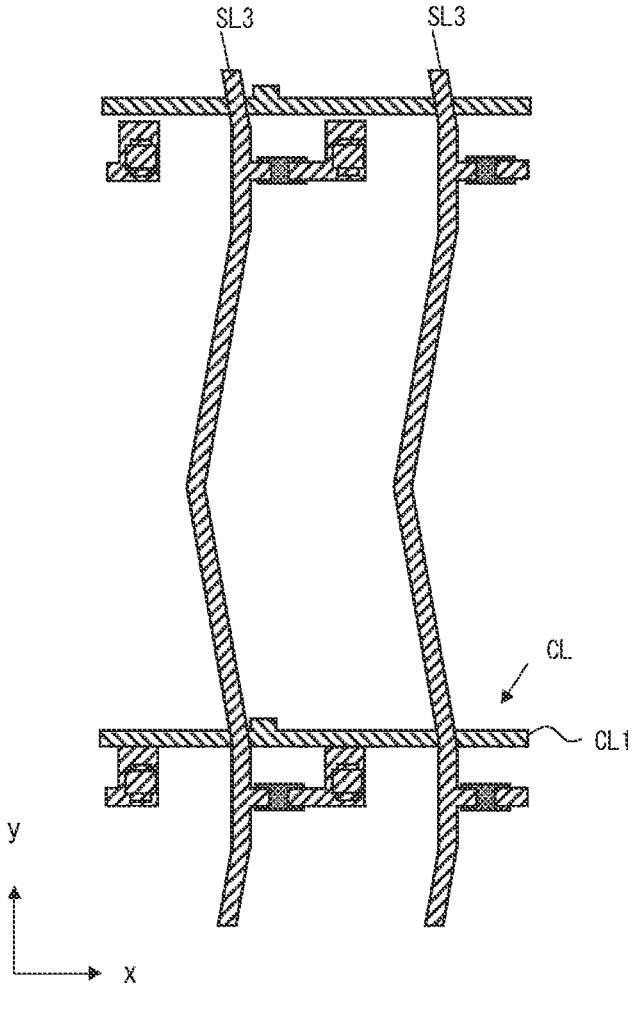
FIG. 23 is a plan view of a capacitance line and source bus lines.

FIG. 20 is a plan view of a pixel electrode PE, source bus lines SL, and a capacitance line CL. FIGS. 21, 22, and 23 are plan views illustrating how the capacitance line CL and the source bus lines SL are positioned.

Each capacitance line CL has the first portion CL1 positioned to overlap with the second bending portion PEO2 of the opening portion PEO of the pixel electrode PE in each of the pixels PX arranged in the x-axis direction. The second portions CL2 extend toward a center of each of the pixels, from the first portion CL1 in a direction in which the source bus lines SL extends.

The second bending portion PEO2 is disposed near the drain electrode 15 of the TFT. The pixel electrode PE is connected to the drain electrode 15 through a contact hole provided to the insulating layer 19, the planarization layer 17, and the insulating layer 16. Hence, above the drain electrode 15, the contact hole affects the liquid crystal, and the orientation of the liquid crystal is misaligned. Each of the capacitance lines CL is positioned to overlap with the second bending portion PEO2. Hence, each capacitance line CL can cover a region in which the orientation of the liquid crystal is misaligned because of the contact hole. Hence, the feature makes it possible to block light from the region in which the liquid crystal is misaligned by the bend of the opening included in the pixel electrode PE and shaped into a slit described in the first embodiment, and additionally from at least a portion of a region in which the liquid crystal is misaligned because of the contact hole. As a result, the display can present a high contrast with little afterimage.

Third Embodiment

Figure 24:
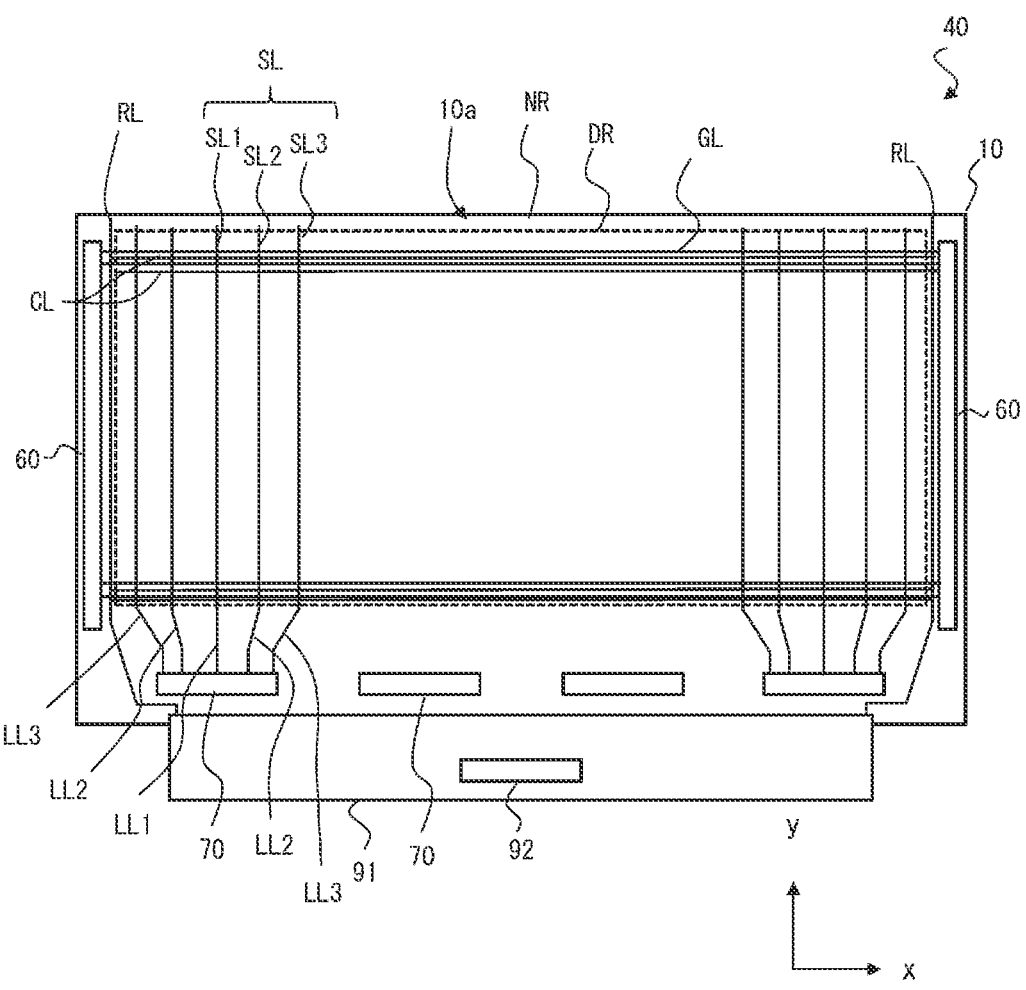
FIG. 24 is a schematic plan view of a configuration of an active matrix substrate for a liquid crystal display device according to a third embodiment.
Figure 25:
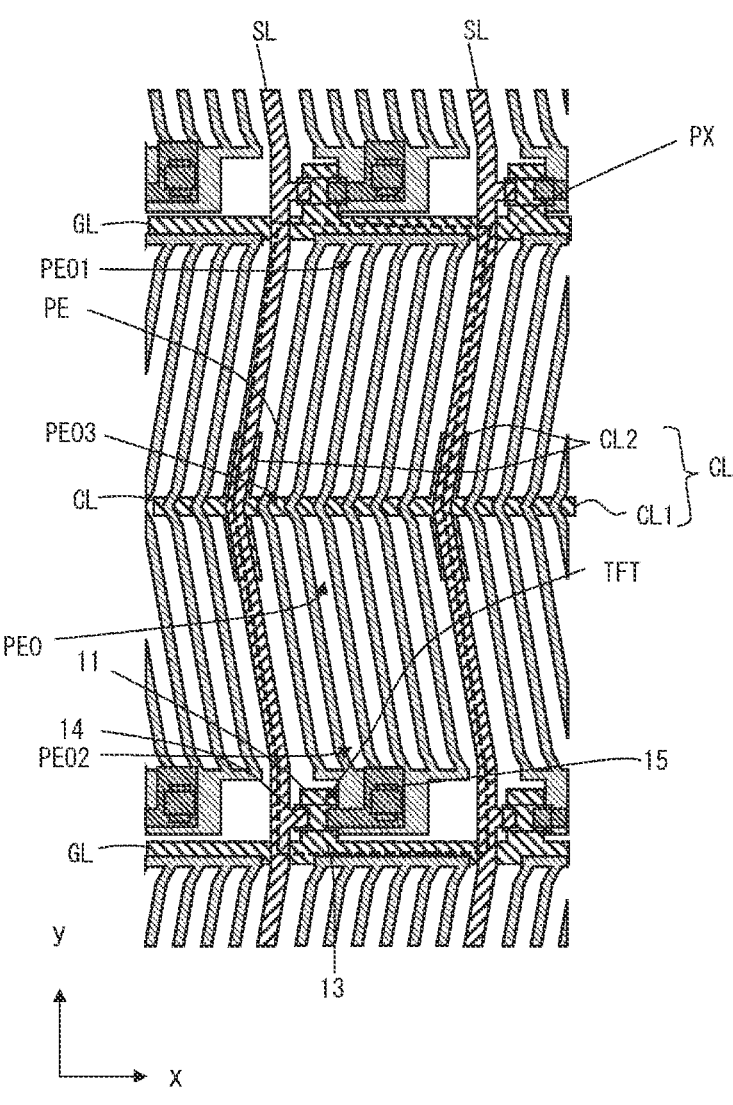
FIG. 25 is a plan view of a pixel electrode, source bus lines, gate bus lines, and a capacitance line.

FIG. 24 is a plan view of an example of the active matrix substrate 40 for a liquid crystal display device of this embodiment. FIG. 25 is a plan view of a pixel electrode PE in each pixel, source bus lines SL, gate bus lines, and a capacitance line CL. Furthermore, FIGS. 26, 27, and 28 are plan views of source bus lines SL and a capacitance line CL in each pixel.

The liquid crystal display device of this embodiment differs from the liquid crystal display device 101 of the first embodiment in that each of the capacitance lines CL is disposed to the third bending portion PEO3 of the opening portion PEO of the pixel electrode PE.

Figure 26:
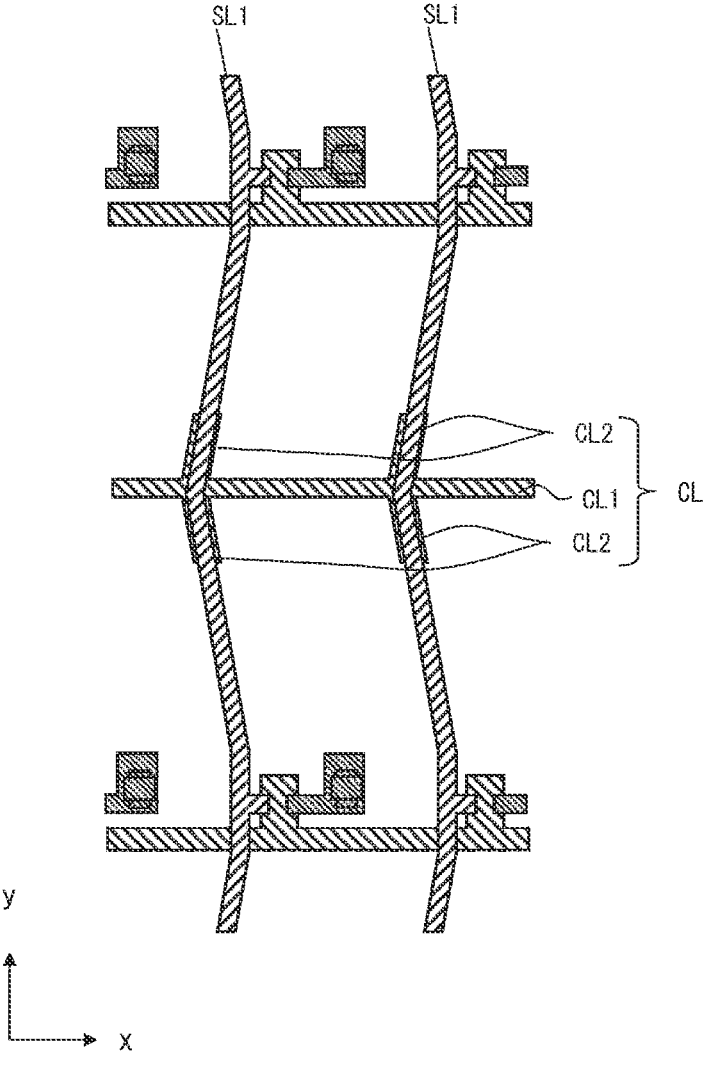
FIG. 26 is a plan view of a capacitance line and source bus lines.

As illustrated in FIG. 26, each capacitance line CL has the first portion CL1 positioned to overlap with the third bending portion PEO3 of the opening portion PEO of each of the pixels arranged in the first direction. Furthermore, the first portion CL1 of each capacitance line CL extends in the x-axis direction to intersect with the first source bus line SL1, the second source bus line SL2, and the third source bus line SL3. That is, each capacitance line CL extends in the x-axis direction to intersect with the plurality of source bus lines SL. As illustrated in FIG. 24, each capacitance line CL has opposing ends extending to the non-display region NR. In the non-display region, the opposing ends are connected to the common wire RL, and supplied with a common potential sent from the control apparatus 90. Note that, also in this embodiment, as seen in the first and second embodiments, a contact hole may be provided in the display region DR to connect together the capacitance lines CL and the common electrode 18.

Figure 27:
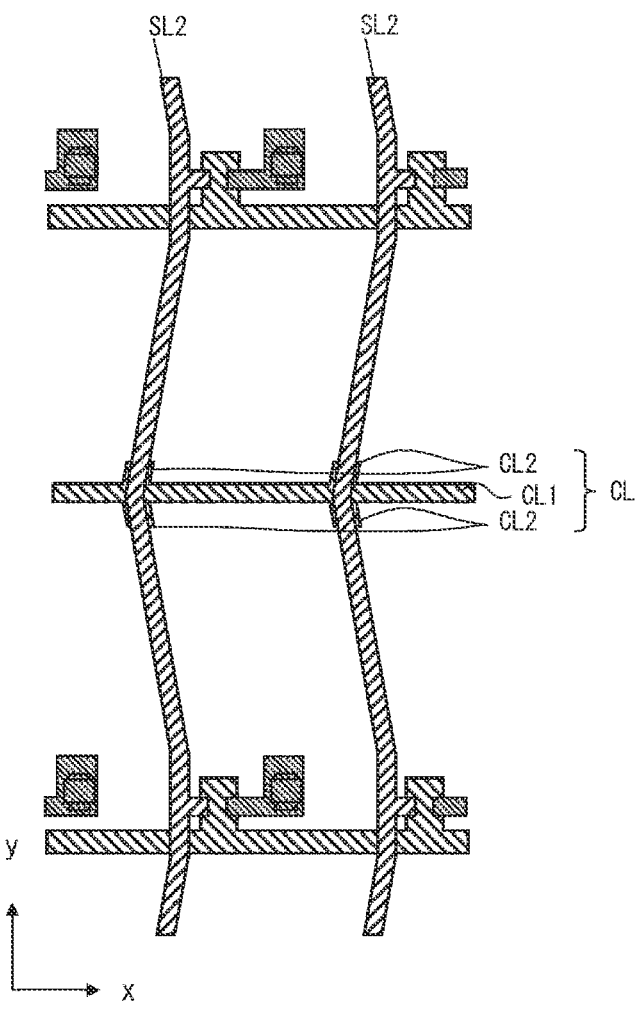
FIG. 27 is a plan view of a capacitance line and source bus lines.
Figure 28:
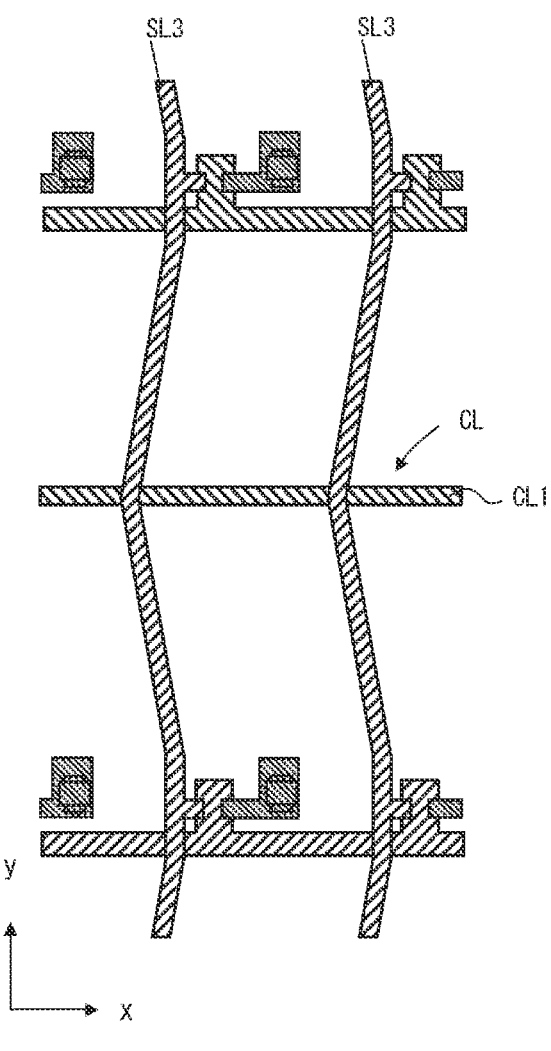
FIG. 28 is a plan view of a capacitance line and source bus lines.

As illustrated in FIGS. 26 and 27, each capacitance line CL has the second portions CL2 overlapping with the first source bus line and the second source bus line and extending, in a direction in which the source bus lines extend, at intersections with the source bus lines. Each of the second portions CL2 extends from the first portion CL1 toward the first bending portion PEO1 and the second bending portion PEO2. In the embodiment illustrated in FIGS. 26 and 27, the second portions CL2 extends toward both the first bending portion PEO1 and the second bending portion PEO2. However, the second portion CL2 may extends toward one direction alone.

As illustrated in FIG. 28, the capacitance line CL does not have the second portion CL2 in a position overlapping with each of the third source bus lines SL3.

As to each of the capacitance lines CL, the length l11 of a second portion CL2 overlapping with a first source bus line SL1 is greater than the length l12 of a second portion CL2 overlapping with a second source bus line SL2 (l11>l12). Here, in overlaps with the second portion CL2, a width of the first source bus line SL1 is the same as a width of the second source bus line SL2. Hence, an area in which the second source bus line SL2 and the second portion CL2 overlap with each other is smaller than an area in which the first source bus line SL1 and the second portion CL2 overlap with each other. Hence, the parasitic capacitance cc2 formed with the second source bus line SL2 and the plurality of capacitance lines CL is smaller than the parasitic capacitance cc1 formed with the first source bus line and the plurality of capacitance lines CL (cc1>cc2). Here, the length of the second portion is a sum of the length of the second portion extending to the first bending portion PEO1 and the length of the second portion extending to the second bending portion PEO2, and does not include the first portion CL1. Furthermore, at an intersection with each third source bus line SL3, the capacitance line CL does not have the second portion extending in a direction in which the third source bus line extends. Here, in the overlaps with the second portion CL2, a width of the second source bus line SL2 is the same as a width of the third source bus line SL3. Hence, an area in which the third source bus line SL3 and the capacitance line CL overlap with each other is smaller than an area in which the second source bus line SL2 and the capacitance line CL overlap with each other. Hence, the parasitic capacitance cc3 formed with the third source bus line and the plurality of capacitance lines CL is smaller than the parasitic capacitance cc2 formed with the second source bus line and the plurality of capacitance lines CL (cc2>cc3).

As can be seen in the first and second embodiments, the liquid crystal display device of this embodiment allows different parasitic capacitances to form for the connected source bus lines, and successfully reduces the difference caused between the parasitic capacitances because of the difference in length between the source lead lines. Furthermore, the capacitance lines are connected to the common potential. As a result, even if a level signal is applied to the pixel electrode or a source bus line when the display device is driven, such a feature reduces variations in parasitic capacitance of the capacitance line. Moreover, the first portion of the capacitance line CL is disposed to overlap with the third bending portion PEO3 in which orientation of the liquid crystal is misaligned. Such a feature keeps an aperture ratio from substantially reducing.

Other Embodiments

The liquid crystal display device of the present disclosure shall not be limited to the above embodiments, but may be modified in various manners. First, in the above embodiments, the capacitance lines CL have two kinds of second portions CL2 (i.e., the first second-portion CL2 and the second second-portion CL2) with different lengths. Whereas, the capacitance line CL may have the second portions CL2 with three or more different lengths. Furthermore, the source lead lines LL include three kinds of lead lines with different lengths. Whereas, the source lead lines LL may include four or more kinds of lead lines with different lengths. For example, the capacitance lines CL may have the second portions CL2 with m kinds of lengths, and the source lead lines LL may include n kinds of lead lines with different lengths. Here, m is an integer of 2 or more, and n is an integer of 3 or more. Moreover, m and n may be either the same number or different numbers.

Here, of the two source bus lines overlapping with any given two second portions with different lengths, one source bus line is referred to as the first source bus line SL1, and another source bus line is referred to as the second source bus line SL2. In addition, a source lead line LL connected to the first source lead line SL1 is referred to as the first source lead line LL1, and a source lead line LL connected to the second source bus line SL2 is referred to as the second source lead line LL2. When the first source bus line SL1 and the first source lead line LL1 thus determined satisfy the above relationships with the second source bus line SL2 and the second source lead line LL2, the liquid crystal display device can exhibit the advantageous effects described in the above embodiments.

Furthermore, in this case, the third source bus line SL3 has the above structure. That is, in the first embodiment, the third source bus line SL3 is at least one of the source bus lines not intersecting with the capacitance lines CL, and the third source lead line LL3 is a source lead line connected to the source bus line. When the third source bus line SL3 and the third source lead line LL3 thus determined satisfy the above relationships with the second source bus line SL2 and the second source lead line LL2, the liquid crystal display device can exhibit the advantageous effects described in the above embodiments.

The shapes and arrangements of the constituent elements of the liquid crystal display device described in each of the embodiments are examples, and the constituent elements may have other shapes, and may be arranged in other manners.

The liquid crystal display device of the present disclosure can also be described as follows.

A liquid crystal display device according to a first configuration includes:

a substrate having a main surface including a display region and a non-display region positioned out of the display region;

a plurality of gate bus lines positioned in the display region and extending in a first direction;

a plurality of source bus lines positioned in the display region, extending in a direction intersecting with the plurality of gate bus lines, and including at least one first source bus line and at least one second source bus line;

a plurality of pixels arranged two-dimensionally in the display region, and each surrounded with a pair of gate bus lines included in the plurality of gate bus lines and adjacent to each other and with a pair of source bus lines included in the plurality of source bus lines and adjacent to each other;

at least one source driver disposed in the non-display region;

a plurality of source lead lines connecting the plurality of source bus lines at one end to the source driver; and a plurality of capacitance lines positioned in the display region, each disposed to intersect with the at least one first source bus line and the at least one second source bus line, and connected to a common potential, wherein each of the capacitance lines has: a first portion extending in the first direction; and a plurality of second portions extending, in a direction in which the source bus lines extend, at intersections with the at least one first source bus line and the at least one second source bus line, the plurality of second portions overlapping with the source bus lines, the plurality of source lead lines include: at least one first source lead line; and at least one second source lead line, the at least one first source lead line is connected to the at least one first source bus line, and the at least one second source lead line is connected to the at least one second source bus line, the at least one second source lead line is longer than the at least one first source lead line, and an area in which the third source bus line and one of the plurality of capacitance lines overlap with each other is smaller than an area in which the second source bus line and one of the plurality of capacitance lines overlap with each other.

In the liquid crystal display device of a second configuration according to the first configuration, the second source lead line may be longer than the first source lead line, and among the plurality of second portions of each of the capacitance lines, when a second portion overlapping with the second source bus line has a length along the second source bus line, and a second portion overlapping with the first source bus line has a length along first source bus line, the length along the second source bus line may be smaller than the length along the first source bus line.

In the liquid crystal display device of a third configuration according to the first configuration, the plurality of source lead lines may further include at least one third source lead line, the plurality of source bus lines may further include at least one third source bus line to which the at least one third source lead line is connected, the at least one third source lead line may be longer than the at least one second source lead line, and the third source bus line does not have to intersect with the plurality of capacitance lines.

The liquid crystal display device of a fourth configuration according to the third configuration may further include a plurality of dummy wires arranged in the display region.

Each of the dummy wires may extend in the first direction, may be adjacent to the third source bus line, and may be a direct extension of one of the plurality of the capacitance lines. The dummy wires do not have to intersecting with any of the plurality of source bus lines.

In the liquid crystal display device of a fifth configuration according to the first configuration, the plurality of source lead lines may further include at least one third source lead line, the plurality of source bus lines may further include at least one third source bus line connected to the at least one third source lead line, the at least one third source lead line may be longer than the at least one second source lead line, the first portion of each of the capacitance lines may extend to intersect with the third source bus line, and an area in which the third source bus line and one of the plurality of capacitance lines overlap with each other may be smaller than an area in which the second source bus line and one of the plurality of capacitance lines overlap with each other.

In the liquid crystal display device of a sixth configuration according to the fifth configuration, at an intersection with the third source bus line, each of the capacitance lines does not have to have the second portions extending in a direction in which the third source bus line extends.

In the liquid crystal display device of a seventh configuration according to the first or second configuration, each of the plurality of pixels may include: a pixel electrode; and a TFT connected to the pixel electrode, the pixel electrode may have a plurality of opening portions shaped into slits and extending along the plurality of source bus lines, and each of the capacitance lines may be disposed in the display region to overlap with bends of the plurality of opening portions included in the pixel electrode of pixels included in the plurality of pixels and arranged in the first direction.

In the liquid crystal display device of an eighth configuration according to the seventh configuration, each of the plurality of opening portions may have: a first bending portion and a second bending portion disposed near respective gate bus lines included in the pair of gate bus lines; and a third bending portion positioned between the first bending portion and the second bending portion.

In the liquid crystal display device of a ninth configuration according to the eighth configuration, each of the capacitance lines may be disposed in the display region to overlap with either the first bending portion or the second bending portion of each of the pixels arranged in the first direction.

In the liquid crystal display device of a tenth configuration according to the eighth configuration, each of the capacitance lines may be disposed in the display region to overlap with the third bending portion of each of the pixels arranged in the first direction, and each of the plurality of second portions may extend from the first portion toward the first bending portion and the second bending portion.

The liquid crystal display device of an eleventh configuration according to the eighth configuration may further include a common electrode disposed in the display region to overlap with the pixel electrode.

The plurality of capacitance lines may be electrically connected to the common electrode in the display region.

In the liquid crystal display device of a twelfth configuration according to the eleventh configuration, in the display region, each of the plurality of capacitance lines may be electrically connected to the common electrode at a plurality of positions.

In the liquid crystal display device of a thirteenth configuration according to any one of the first to twelfth configurations, the plurality of capacitance lines may extend to reach the non-display region, and in the non-display region, the plurality of capacitance lines may be connected to a wire that supplies a common potential.

In the liquid crystal display device of a fourteenth configuration according to the first configuration, the plurality of capacitance lines and the plurality of gate bus lines may include a same metal layer.

In the liquid crystal display device of a fifteenth configuration according to the third or fifth configuration, at least any two of the at least one first source lead line, the at least one second source lead line, and the at least one third source lead line may partially overlap with one another in plan view.

What is claimed is:

1. A liquid crystal display device, comprising:

a substrate having a main surface including a display region and a non-display region positioned out of the display region;

a plurality of gate bus lines positioned in the display region, and extending in a first direction;

a plurality of source bus lines positioned in the display region, extending in a direction intersecting with the plurality of gate bus lines, and including at least one first source bus line, at least one second source bus line, and at least one third source bus line;

a plurality of pixels arranged two-dimensionally in the display region, each pixel of the plurality of pixels surrounded with:

a pair of gate bus lines included in the plurality of gate bus lines and adjacent to each other, and a pair of source bus lines included in the plurality of source bus lines and adjacent to each other;

at least one source driver disposed in the non-display region;

a plurality of source lead lines connecting the plurality of source bus lines, at one end, to the source driver, the plurality of source lead lines including at least one first source lead line, at least one second source lead line, and at least one third source lead line; and a plurality of capacitance lines positioned in the display region, each of the plurality of capacitance lines disposed to intersect with the at least one first source bus line and the at least one second source bus line, and connected to a common potential, wherein:
    each of the plurality of capacitance lines has:
        a first portion extending in the first direction; and
        a plurality of second portions extending, in a direction in which the plurality of source bus lines extend, at intersections with the at least one first source bus line and the at least one second source bus line, the plurality of second portions overlapping the plurality of source bus lines,
        the at least one first source lead line is connected to the at least one first source bus line, the at least one second source lead line is connected to the at least one second source bus line, and the at least one third source lead line is connected to the at least one third source bus line, the at least one second source lead line is longer than the at least one first source lead line, the at least one third source lead line is longer than the at least one second source lead line,
        the third source bus line does not intersect with the plurality of capacitance lines, and
        an area in which the second source bus line and one of the plurality of capacitance lines overlap each other is smaller than an area in which the first source bus line and one of the plurality of capacitance lines overlap each other.
2. A liquid crystal display device, comprising:
a substrate having a main surface including a display region and a non-display region positioned out of the display region;
a plurality of gate bus lines positioned in the display region, and extending in a first direction;
a plurality of source bus lines positioned in the display region, extending in a direction intersecting with the plurality of gate bus lines, and including at least one first source bus line and at least one second source bus line;
a plurality of pixels arranged two-dimensionally in the display region, each pixel of the plurality of pixels surrounded with:
a pair of gate bus lines included in the plurality of gate bus lines and adjacent to each other, and
    a pair of source bus lines included in the plurality of source bus lines and adjacent to each other;
at least one source driver disposed in the non-display region;
a plurality of source lead lines connecting the plurality of source bus lines, at one end, to the source driver, the plurality of source lead lines including at least one first source lead line and at least one second source lead line; and
a plurality of capacitance lines positioned in the display region, each of the plurality of capacitance lines disposed to intersect with the at least one first source bus line and the at least one second source bus line, and connected to a common potential,
wherein:
    each of the plurality of capacitance lines has:
        a first portion extending in the first direction; and
        a plurality of second portions extending, in a direction in which the plurality of source bus lines extend, at intersections with the at least one first source bus line and the at least one second source bus line, the plurality of second portions overlapping the plurality of source bus lines,
        the at least one first source lead line is connected to the at least one first source bus line, and the at least one second source lead line is connected to the at least one second source bus line,
        the at least one second source lead line is longer than the at least one first source lead line, and
        an area in which the second source bus line and one of the plurality of capacitance lines overlap each other is smaller than an area in which the first source bus line and one of the plurality of capacitance lines overlap each other,
        among the plurality of second portions of each of the plurality of capacitance lines, in a case that a second portion overlapping the second source bus line has a length along the second source bus line, and a second portion overlapping the first source bus line has a length along the first source bus line, the length along the second source bus line is shorter than the length along the first source bus line.
3. The liquid crystal display device according to claim 1, further comprising:
a plurality of dummy wires arranged in the display region, wherein:
    each of the plurality of dummy wires extends in the first direction, is adjacent to the third source bus line, and is a direct extension of one of the plurality of the capacitance lines, and
    the plurality of dummy wires does not intersect with any of the plurality of source bus lines.
4. A liquid crystal display device, comprising:
a substrate having a main surface including a display region and a non-display region positioned out of the display region;
a plurality of gate bus lines positioned in the display region, and extending in a first direction;
a plurality of source bus lines positioned in the display region, extending in a direction intersecting with the plurality of gate bus lines, and including at least one first source bus line, at least one second source bus line, and at least one third source bus line;
a plurality of pixels arranged two-dimensionally in the display region, each pixel of the plurality of pixels surrounded with:
    a pair of gate bus lines included in the plurality of gate bus lines and adjacent to each other, and
    a pair of source bus lines included in the plurality of source bus lines and adjacent to each other;
at least one source driver disposed in the non-display region;
a plurality of source lead lines connecting the plurality of source bus lines, at one end, to the source driver, including at least one first source lead line, at least one second source lead line, and at least one third source led line; and
a plurality of capacitance lines positioned in the display region, each of the plurality of capacitance lines disposed to intersect with the at least one first source bus line and the at least one second source bus line, and connected to a common potential,
wherein:
    each of the plurality of capacitance lines has:
        a first portion extending in the first direction; and
        a plurality of second portions extending, in a direction in which the plurality of source bus lines extend, at intersections with the at least one first source bus line and the at least one second source bus line, the plurality of second portions overlapping the plurality of source bus lines, the at least one first source lead line is connected to the at least one first source bus line, the at least one second source lead line is connected to the at least one second source bus line, and the at least one third source lead line is connected to the at least one third source bus line, the at least one second source lead line is longer than the at least one first source lead line, and the at least one third source lead line is longer than the at least one second source lead line, an area in which the second source bus line and one of the plurality of capacitance lines overlap each other is smaller than an area in which the first source bus line and one of the plurality of capacitance lines overlap each other, the first portion of each of the plurality of capacitance lines extends to intersect with the third source bus line, and an area in which the third source bus line and one of the plurality of capacitance lines overlap each other is smaller than an area in which the second source bus line and one of the plurality of capacitance lines overlap each other.

5. The liquid crystal display device according to claim 4, wherein, at an intersection with the third source bus line, each of the plurality of capacitance lines does not have the second portions extending in a direction in which the third source bus line extends.

6. The liquid crystal display device according to claim 1, wherein:

each of the plurality of pixels includes:

a pixel electrode; and a thin-film transistor (TFT) connected to the pixel electrode, the pixel electrode has a plurality of opening portions shaped into slits, and extending along the plurality of source bus lines, and each first portion of the plurality of capacitance lines is disposed in the display region to overlap bends of the plurality of opening portions included in the pixel electrodes of pixels included in the plurality of pixels that are arranged in the first direction.

7. The liquid crystal display device according to claim 6, wherein each of the plurality of opening portions comprises:

a first bending portion and a second bending portion, the first bending portion disposed near one of the pair of gate bus lines, and the second bending portion disposed near the other one of the pair of gate bus lines; and a third bending portion positioned between the first bending portion and the second bending portion.

8. The liquid crystal display device according to claim 7, wherein each of the plurality of capacitance lines is disposed in the display region to overlap either the first bending portion or the second bending portion of each of the pixels arranged in the first direction.

9. The liquid crystal display device according to claim 7, wherein each of the plurality of capacitance lines is disposed in the display region to overlap the third bending portion of each of the plurality of pixels arranged in the first direction, and each of the plurality of second portions extends from the first portion toward the first bending portion and the second bending portion.

10. The liquid crystal display device according to claim 1, further comprising:

a common electrode disposed in the display region to overlap a pixel electrode, wherein the plurality of capacitance lines is electrically connected to the common electrode in the display region.

11. The liquid crystal display device according to claim 10, wherein, in the display region, each of the plurality of capacitance lines is electrically connected to the common electrode at a plurality of positions.

12. The liquid crystal display device according to claim 1, wherein the plurality of capacitance lines extends to reach the non-display region, and in the non-display region, the plurality of capacitance lines is connected to a wire that supplies the common potential.

13. The liquid crystal display device according to claim 1, wherein the plurality of capacitance lines and the plurality of gate bus lines include a same metal layer.

14. The liquid crystal display device according to claim 12, wherein at least any two of the at least one first source lead line, the at least one second source lead line, and the at least one third source lead line partially overlap one another in a plan view.

* * * * *